(12) United States Patent
Paladugu et al.

(10) Patent No.: US 11,700,654 B2
(45) Date of Patent: Jul. 11, 2023

(54) USER EQUIPMENT TO NETWORK RELAY

(71) Applicant: QUALCOMM Incorporated, San Diego, CA (US)

(72) Inventors: Karthika Paladugu, San Diego, CA (US); Gavin Bernard Horn, La Jolla, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 17/248,476

(22) Filed: Jan. 26, 2021

(65) Prior Publication Data

US 2021/0243829 A1 Aug. 5, 2021

Related U.S. Application Data

(60) Provisional application No. 62/968,923, filed on Jan. 31, 2020.

(51) Int. Cl.
*H04W 76/14* (2018.01)
*H04W 76/27* (2018.01)
(Continued)

(52) U.S. Cl.
CPC .......... *H04W 76/14* (2018.02); *H04W 76/27* (2018.02); *H04W 76/28* (2018.02); *H04W 80/02* (2013.01); *H04W 92/18* (2013.01)

(58) Field of Classification Search
CPC ..... H04W 76/14; H04W 76/27; H04W 76/28; H04W 80/02; H04W 92/18; H04W 76/12; H04W 88/04
See application file for complete search history.

(56) References Cited

U.S. PATENT DOCUMENTS

2018/0255499 A1* 9/2018 Loehr .................... H04W 76/23
2019/0394816 A1* 12/2019 Kim ....................... H04W 76/10
(Continued)

FOREIGN PATENT DOCUMENTS

EP 3148285 A1 3/2017
EP 3399819 A1 11/2018
(Continued)

OTHER PUBLICATIONS

3GPP TSG-RAN WG2 # 104; R2-1816517, Source: Huawei, HiSilicon, Title: Potential AS layer impacts on SL connection setup and configuration in unicast, Spokane, USA, Nov. 12-16, 2018. (Year: 2018).*
(Continued)

*Primary Examiner* — Mohammed S Chowdhury
(74) *Attorney, Agent, or Firm* — Harrity & Harrity, LLP

(57) ABSTRACT

Various aspects of the present disclosure generally relate to wireless communication. In some aspects, a remote user equipment (UE) may establish, via a sidelink signaling interface, a unicast link between the remote UE and a relay UE; establish a connection with a base station via the relay UE, wherein a message associated with establishing the connection is communicated via the unicast link; establish one or more bearers based at least in part on a radio bearer configuration received from the base station via the connection; establish, with the relay UE, one or more sidelink access stratum entities for the one or more bearers using one or more sidelink radio resource control messages based at least in part on an access stratum configuration received from the base station via the connection; and receive or transmit control-plane or user-plane traffic via the one or more bearers.

45 Claims, 18 Drawing Sheets

(51) Int. Cl.
    *H04W 80/02*      (2009.01)
    *H04W 76/28*      (2018.01)
    *H04W 92/18*      (2009.01)

(56) References Cited

U.S. PATENT DOCUMENTS

| | | | |
|---|---|---|---|
| 2020/0120728 A1* | 4/2020 | Wallentin | H04W 76/25 |
| 2020/0163005 A1* | 5/2020 | Rao | H04W 4/40 |
| 2020/0344722 A1* | 10/2020 | He | H04W 72/0446 |
| 2021/0045093 A1* | 2/2021 | Rao | H04W 36/0009 |

FOREIGN PATENT DOCUMENTS

| | | |
|---|---|---|
| GB | 2548374 A | 9/2017 |
| WO | 2018203723 A1 | 11/2018 |
| WO | 2021055204 | 3/2021 |

OTHER PUBLICATIONS

3GPP TSG-RAN WG2 Meeting #104; R2-1816522, Source: Huawei, HiSilicon, Title: Radio bearer configuration and management for NR sidelink, Spokane, USA, Nov. 12-16, 2018 (Year: 2018).*
3GPP TSG-RAN WG2 Meeting #108; R2-1915973, Source: Huawei, HiSilicon, Title: Further details of Uu RRC procedures for NR sidelink, Reno, USA, Nov. 18-22, 2019 (Year: 2019).*
International Search Report and Written Opinion—PCT/US2021/070083—ISA/EPO—dated May 3, 2021.

* cited by examiner

USER EQUIPMENT TO NETWORK RELAY

CROSS-REFERENCE TO RELATED APPLICATION

This patent application claims priority to U.S. Provisional Patent Application No. 62/968,923, filed on Jan. 31, 2020, entitled "LAYER 2 USER EQUIPMENT-TO-NETWORK RELAY," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a user equipment (UE)-to-network relay.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a remote UE, may include establishing, via a sidelink signaling interface, a unicast link between the remote UE and a relay UE; establishing a connection with a base station via the relay UE, wherein a message associated with establishing the connection is communicated via the unicast link; establishing one or more bearers based at least in part on a radio bearer configuration received from the base station via the connection; establishing, with the relay UE, one or more sidelink access stratum entities for the one or more bearers using one or more sidelink radio resource control messages based at least in part on an access stratum configuration received from the base station via the connection; and receiving or transmitting control-plane or user-plane traffic via the one or more bearers.

In some aspects, a method of wireless communication, performed by a base station, may include establishing a connection with a remote UE via a relay UE, wherein a message associated with establishing the connection is communicated via a unicast link between the remote UE and the relay UE; transmitting a radio bearer configuration and an access stratum configuration for one or more bearers via the connection, wherein the access stratum configuration is for one or more sidelink access stratum entities of the remote UE and the relay UE, and wherein the access stratum configuration indicates a parameter associated with a radio resource control (RRC) state operation; and receiving or transmitting control-plane or user-plane traffic associated with the remote UE via the one or more bearers.

In some aspects, a method of wireless communication, performed by a relay UE, may include establishing, via a sidelink signaling interface, a unicast link between the relay UE and a remote UE; relaying a message associated with establishing a connection between the remote UE and a base station via the unicast link; establishing one or more sidelink access stratum entities with the remote UE, for one or more bearers of the remote UE that are associated with the connection, based at least in part on a sidelink access stratum configuration; establishing one or more radio access stratum entities with the base station, for the one or more bearers of the remote UE that are associated with the connection, based at least in part on a radio access stratum configuration received by the relay UE; and relaying control-plane or user-plane traffic between the remote UE and the base station via the one or more sidelink access stratum entities and the one or more radio access stratum entities.

In some aspects, a remote UE for wireless communication may include a memory and one or more processors operatively coupled to the memory. The memory and the one or more processors may be configured to establish, via a sidelink signaling interface, a unicast link between the remote UE and a relay UE; establish a connection with a base station via the relay UE, wherein a message associated with establishing the connection is communicated via the unicast link; establish one or more bearers based at least in part on a radio bearer configuration received from the base station via the connection; establish, with the relay UE, one or more sidelink access stratum entities for the one or more bearers using one or more sidelink radio resource control messages based at least in part on an access stratum configuration received from the base station via the connection; and receive or transmit control-plane or user-plane traffic via the one or more bearers.

In some aspects, a base station for wireless communication may include a memory and one or more processors operatively coupled to the memory. The memory and the one or more processors may be configured to establish a connection with a remote UE via a relay UE, wherein a message associated with establishing the connection is communicated via a unicast link between the remote UE and the relay UE; transmit a radio bearer configuration and an access stratum configuration for one or more bearers via the connection, wherein the access stratum configuration is for one or more sidelink access stratum entities of the remote UE and the relay UE, and wherein the access stratum configuration indicates a parameter associated with a radio resource control (RRC) state operation; and receive or transmit control-plane or user-plane traffic associated with the remote UE via the one or more bearers.

In some aspects, a relay UE for wireless communication may include a memory and one or more processors operatively coupled to the memory. The memory and the one or more processors may be configured to establish, via a sidelink signaling interface, a unicast link between the relay UE and a remote UE; relay a message associated with establishing a connection between the remote UE and a base station via the unicast link; establish one or more sidelink access stratum entities with the remote UE, for one or more bearers of the remote UE that are associated with the connection, based at least in part on a sidelink access stratum configuration; establish one or more radio access stratum entities with the base station, for the one or more bearers of the remote UE that are associated with the connection, based at least in part on a radio access stratum configuration received by the relay UE; and relay control-plane or user-plane traffic between the remote UE and the base station via the one or more sidelink access stratum entities and the one or more radio access stratum entities.

In some aspects, a non-transitory computer-readable medium may store one or more instructions for wireless communication. The one or more instructions, when executed by one or more processors of a remote UE, may cause the one or more processors to establish, via a sidelink signaling interface, a unicast link between the remote UE and a relay UE; establish a connection with a base station via the relay UE, wherein a message associated with establishing the connection is communicated via the unicast link; establish one or more bearers based at least in part on a radio bearer configuration received from the base station via the connection; establish, with the relay UE, one or more sidelink access stratum entities for the one or more bearers using one or more sidelink radio resource control messages based at least in part on an access stratum configuration received from the base station via the connection; and receive or transmit control-plane or user-plane traffic via the one or more bearers.

In some aspects, a non-transitory computer-readable medium may store one or more instructions for wireless communication. The one or more instructions, when executed by one or more processors of a base station, may cause the one or more processors to establish a connection with a remote UE via a relay UE, wherein a message associated with establishing the connection is communicated via a unicast link between the remote UE and the relay UE; transmit a radio bearer configuration and an access stratum configuration for one or more bearers via the connection, wherein the access stratum configuration is for one or more sidelink access stratum entities of the remote UE and the relay UE, and wherein the access stratum configuration indicates a parameter associated with a radio resource control (RRC) state operation; and receive or transmit control-plane or user-plane traffic associated with the remote UE via the one or more bearers.

In some aspects, a non-transitory computer-readable medium may store one or more instructions for wireless communication. The one or more instructions, when executed by one or more processors of a relay UE, may cause the one or more processors to establish, via a sidelink signaling interface, a unicast link between the relay UE and a remote UE; relay a message associated with establishing a connection between the remote UE and a base station via the unicast link; establish one or more sidelink access stratum entities with the remote UE, for one or more bearers of the remote UE that are associated with the connection, based at least in part on a sidelink access stratum configuration; establish one or more radio access stratum entities with the base station, for the one or more bearers of the remote UE that are associated with the connection, based at least in part on a radio access stratum configuration received by the relay UE; and relay control-plane or user-plane traffic between the remote UE and the base station via the one or more sidelink access stratum entities and the one or more radio access stratum entities.

In some aspects, an apparatus for wireless communication may include means for establishing, via a sidelink signaling interface, a unicast link between the apparatus and a relay UE; means for establishing a connection with a base station via the relay UE, wherein a message associated with establishing the connection is communicated via the unicast link; means for establishing one or more bearers based at least in part on a radio bearer configuration received from the base station via the connection; means for establishing, with the relay UE, one or more sidelink access stratum entities for the one or more bearers using one or more sidelink radio resource control messages based at least in part on an access stratum configuration received from the base station via the connection; and means for receiving or transmitting control-plane or user-plane traffic via the one or more bearers.

In some aspects, an apparatus for wireless communication may include means for establishing a connection with a remote UE via a relay UE, wherein a message associated with establishing the connection is communicated via a unicast link between the remote UE and the relay UE; means for transmitting a radio bearer configuration and an access stratum configuration for one or more bearers via the connection, wherein the access stratum configuration is for one or more sidelink access stratum entities of the remote UE and the relay UE, and wherein the access stratum configuration indicates a parameter associated with a radio resource control (RRC) state operation; and means for receiving or transmitting control-plane or user-plane traffic associated with the remote UE via the one or more bearers.

In some aspects, an apparatus for wireless communication may include means for establishing, via a sidelink signaling interface, a unicast link between the apparatus and a remote UE; means for relaying a message associated with establishing a connection between the remote UE and a base station via the unicast link; means for establishing one or more sidelink access stratum entities with the remote UE, for one or more bearers of the remote UE that are associated with the connection, based at least in part on a sidelink access stratum configuration; means for establishing one or more radio access stratum entities with the base station, for the one or more bearers of the remote UE that are associated with the connection, based at least in part on a radio access stratum configuration received by the apparatus; and means for relaying control-plane or user-plane traffic between the remote UE and the base station via the one or more sidelink access stratum entities and the one or more radio access stratum entities.

In some aspects, a method of wireless communication performed by a remote UE includes communicating a radio access connection establishment message with a network entity via a relay UE, over a first signaling radio bearer that is configured with a sidelink logical channel for communication via an established sidelink unicast link with the relay UE; receiving a radio bearer configuration for one or more bearers from the network entity via a radio access connection that is established based at least in part on the radio access connection establishment message; receiving an access stratum configuration via the radio access connection, wherein the access stratum configuration is associated with configuring one or more sidelink access stratum entities for the one or more bearers; and receiving or transmitting control-plane or user-plane traffic via the one or more bearers based at least in part on the access stratum configuration.

In some aspects, a method of wireless communication performed by a network entity includes establishing a radio access connection with a remote UE via a relay UE, wherein a radio access connection establishment message associated with establishing the radio access connection is communicated via an established sidelink unicast link between the remote UE and the relay UE; transmitting a radio bearer configuration and an access stratum configuration for one or more bearers via the radio access connection, wherein the access stratum configuration is associated with configuring one or more sidelink access stratum entities of the remote UE and the relay UE, and wherein the access stratum configuration indicates at least a parameter associated with an RRC state operation; and receiving or transmitting control-plane or user-plane traffic associated with the remote UE via the one or more bearers based at least in part on the access stratum configuration.

In some aspects, a method of wireless communication performed by a relay UE includes relaying, via a first signaling radio bearer that is configured with a sidelink logical channel for communication via an established sidelink unicast link with a remote UE, a radio access connection establishment message associated with establishing a radio access connection between the remote UE and a network entity via the established sidelink unicast link; receiving a sidelink access stratum configuration for one or more bearers of the remote UE that are associated with the radio access connection, wherein the sidelink access stratum configuration is associated with one or more sidelink access stratum entities; receiving a radio access stratum configuration for the one or more bearers of the remote UE that are associated with the connection, wherein the radio access stratum configuration is associated with one or more radio access stratum entities associated with the network entity; and relaying control-plane or user-plane traffic between the remote UE and the network entity via the one or more bearers.

In some aspects, a remote UE for wireless communication includes a memory; and one or more processors operatively coupled to the memory, the memory and the one or more processors configured to: communicate a radio access connection establishment message with a network entity via a relay UE, over a first signaling radio bearer that is configured with a sidelink logical channel for communication via an established sidelink unicast link with the relay UE; receive a radio bearer configuration for one or more bearers from the network entity via a radio access connection that is established based at least in part on the radio access connection establishment message; receive an access stratum configuration via the radio access connection, wherein the access stratum configuration is associated with configuring one or more sidelink access stratum entities for the one or more bearers; and receive or transmitting control-plane or user-plane traffic via the one or more bearers based at least in part on the access stratum configuration.

In some aspects, a network entity for wireless communication includes a memory; and one or more processors operatively coupled to the memory, the memory and the one or more processors configured to: establish a radio access connection with a remote UE via a relay UE, wherein a radio access connection establishment message associated with establishing the radio access connection is communicated via an established sidelink unicast link between the remote UE and the relay UE; transmit a radio bearer configuration and an access stratum configuration for one or more bearers via the radio access connection, wherein the access stratum configuration is associated with configuring one or more sidelink access stratum entities of the remote UE and the relay UE, and wherein the access stratum configuration indicates at least a parameter associated with an RRC state operation; and receive or transmitting control-plane or user-plane traffic associated with the remote UE via the one or more bearers based at least in part on the access stratum configuration.

In some aspects, a relay UE for wireless communication includes a memory; and one or more processors operatively coupled to the memory, the memory and the one or more processors configured to: relay, via a first signaling radio bearer that is configured with a sidelink logical channel for communication via an established sidelink unicast link with a remote UE, a radio access connection establishment message associated with establishing a radio access connection between the remote UE and a network entity via the established sidelink unicast link; receive a sidelink access stratum configuration for one or more bearers of the remote UE that are associated with the radio access connection, wherein the sidelink access stratum configuration is associated with one or more sidelink access stratum entities; receive a radio access stratum configuration for the one or more bearers of the remote UE that are associated with the connection, wherein the radio access stratum configuration is associated with one or more radio access stratum entities associated with the network entity; and relay control-plane or user-plane traffic between the remote UE and the network entity via the one or more bearers.

In some aspects, a non-transitory computer-readable medium storing a set of instructions for wireless communication includes one or more instructions that, when executed by one or more processors of a remote UE, cause the UE to: communicate a radio access connection establishment message with a network entity via a relay UE, over a first signaling radio bearer that is configured with a sidelink logical channel for communication via an established sidelink unicast link with the relay UE; receive a radio bearer configuration for one or more bearers from the network entity via a radio access connection that is established based at least in part on the radio access connection establishment message; receive an access stratum configuration via the radio access connection, wherein the access stratum configuration is associated with configuring one or more sidelink access stratum entities for the one or more bearers; and receive or transmitting control-plane or user-plane traffic via the one or more bearers based at least in part on the access stratum configuration.

In some aspects, a non-transitory computer-readable medium storing a set of instructions for wireless communication includes one or more instructions that, when executed by one or more processors of a network entity, cause the network entity to: establish a radio access connection with a remote UE via a relay UE, wherein a radio access connection establishment message associated with establishing the radio access connection is communicated via an established sidelink unicast link between the remote UE and the relay UE; transmit a radio bearer configuration and an access stratum configuration for one or more bearers via the radio access connection, wherein the access stratum configuration is associated with configuring one or more sidelink access stratum entities of the remote UE and the relay UE, and wherein the access stratum configuration indicates at least a parameter associated with an RRC state operation; and receive or transmitting control-plane or user-plane traffic associated with the remote UE via the one or more bearers based at least in part on the access stratum configuration.

In some aspects, a non-transitory computer-readable medium storing a set of instructions for wireless communication includes one or more instructions that, when executed by one or more processors of a relay UE, cause the UE to: relay, via a first signaling radio bearer that is configured with a sidelink logical channel for communication via an established sidelink unicast link with a remote UE, a radio access connection establishment message associated with establishing a radio access connection between the remote UE and a network entity via the established sidelink unicast link; receive a sidelink access stratum configuration for one or more bearers of the remote UE that are associated with the radio access connection, wherein the sidelink access stratum configuration is associated with one or more sidelink access stratum entities; receive a radio access stratum configuration for the one or more bearers of the remote UE that are associated with the connection, wherein the radio access stratum configuration is associated with one or more radio access stratum entities associated with the network entity; and relay control-plane or user-plane traffic between the remote UE and the network entity via the one or more bearers.

In some aspects, an apparatus for wireless communication includes means for communicating a radio access connection establishment message with a network entity via a relay UE, over a first signaling radio bearer that is configured with a sidelink logical channel for communication via an established sidelink unicast link with the relay UE; means for receiving a radio bearer configuration for one or more bearers from the network entity via a radio access connection that is established based at least in part on the radio access connection establishment message; means for receiving an access stratum configuration via the radio access connection, wherein the access stratum configuration is associated with configuring one or more sidelink access stratum entities for the one or more bearers; and means for receiving or transmitting control-plane or user-plane traffic via the one or more bearers based at least in part on the access stratum configuration.

In some aspects, an apparatus for wireless communication includes means for establishing a radio access connection with a remote UE via a relay UE, wherein a radio access connection establishment message associated with establishing the radio access connection is communicated via an established sidelink unicast link between the remote UE and the relay UE; means for transmitting a radio bearer configuration and an access stratum configuration for one or more bearers via the radio access connection, wherein the access stratum configuration is associated with configuring one or more sidelink access stratum entities of the remote UE and the relay UE, and wherein the access stratum configuration indicates at least a parameter associated with an RRC state operation; and means for receiving or transmitting control-plane or user-plane traffic associated with the remote UE via the one or more bearers based at least in part on the access stratum configuration.

In some aspects, an apparatus for wireless communication includes means for relaying, via a first signaling radio bearer that is configured with a sidelink logical channel for communication via an established sidelink unicast link with a remote UE, a radio access connection establishment message associated with establishing a radio access connection between the remote UE and a network entity via the established sidelink unicast link; means for receiving a sidelink access stratum configuration for one or more bearers of the remote UE that are associated with the radio access connection, wherein the sidelink access stratum configuration is associated with one or more sidelink access stratum entities; means for receiving a radio access stratum configuration for the one or more bearers of the remote UE that are associated with the connection, wherein the radio access stratum configuration is associated with one or more radio access stratum entities associated with the network entity; and means for relaying control-plane or user-plane traffic between the remote UE and the network entity via the one or more bearers.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
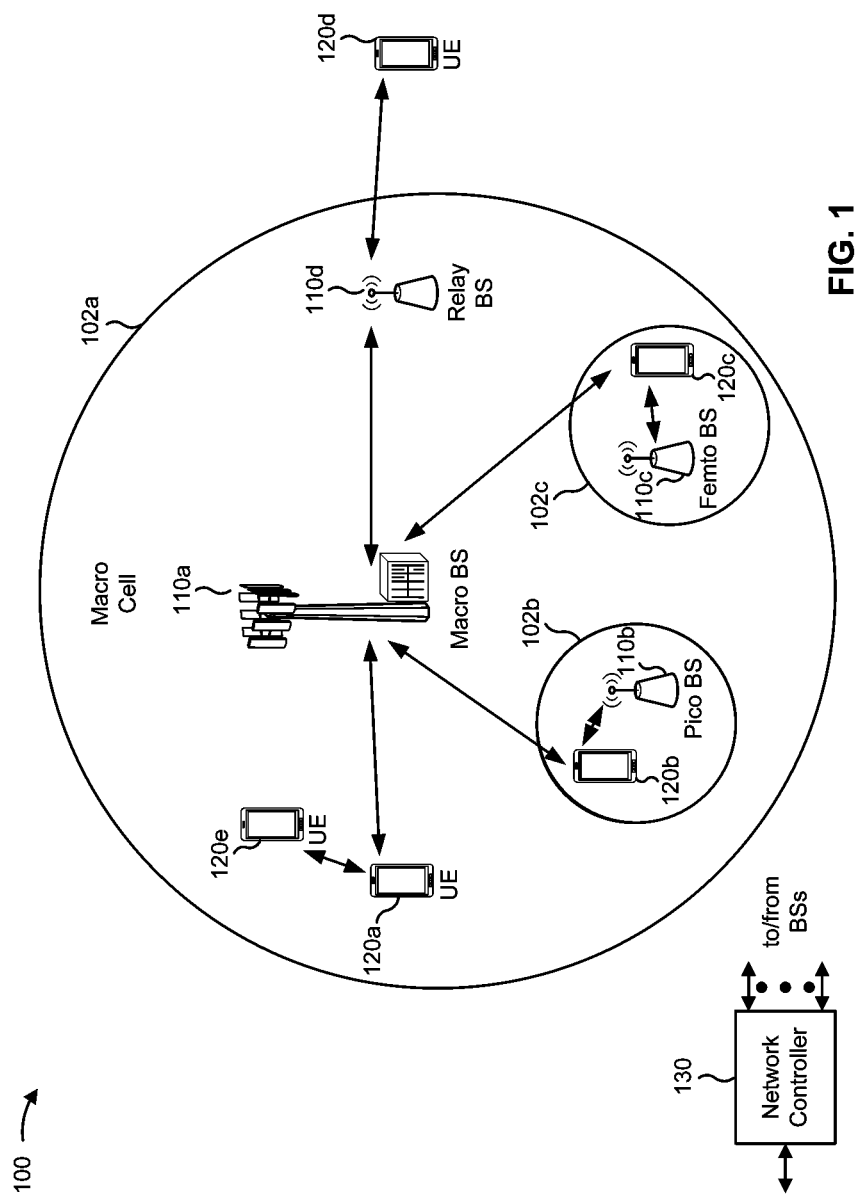
FIG. 1 is a block diagram illustrating an example of a wireless communication network, in accordance with various aspects of the present disclosure.

FIG. 1 is a diagram illustrating an example of a wireless network 100. The wireless network 100 may be or may include elements of a 5G (NR) network and/or an LTE network, among other examples. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, such as macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
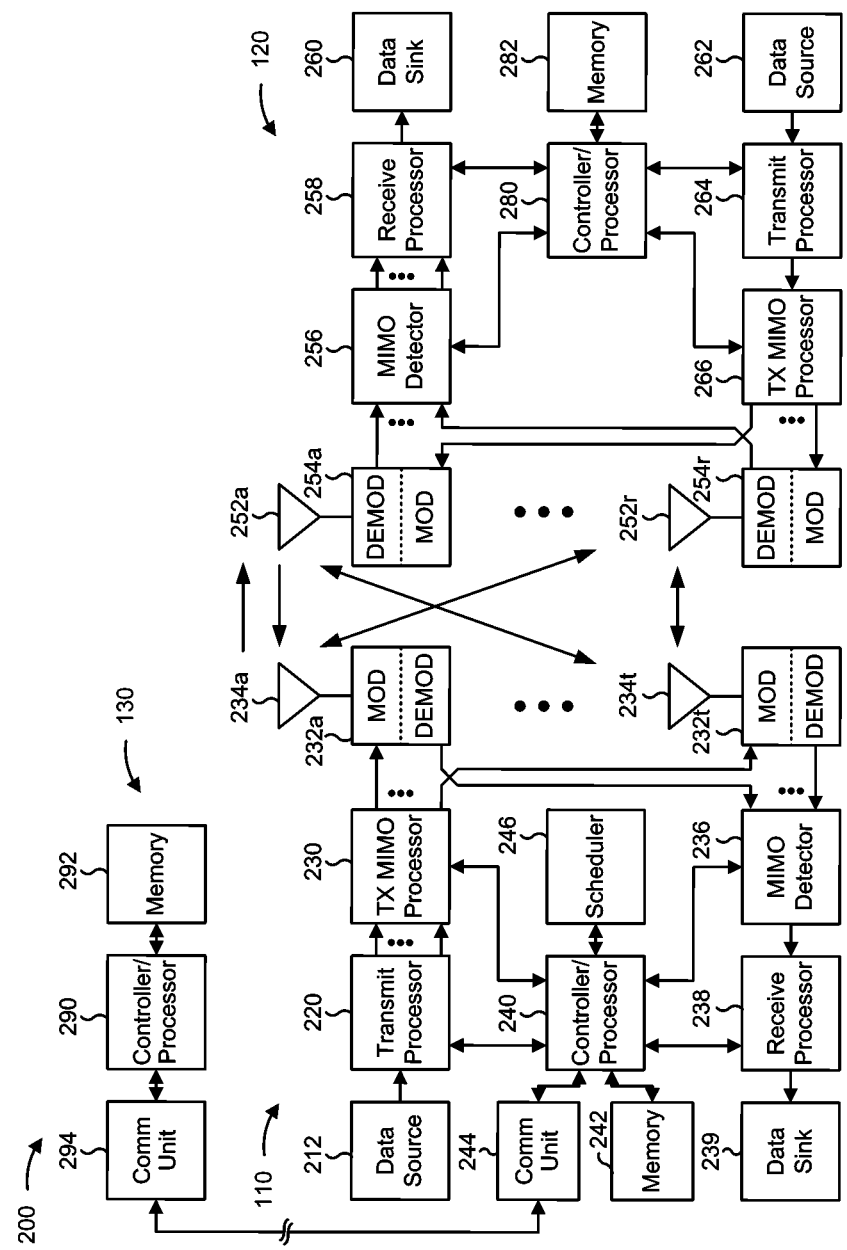
FIG. 2 is a block diagram illustrating an example of a base station in communication with a UE in a wireless communication network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., the cell-specific reference signal (CRS) or a demodulation reference signal (DMRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a Layer 2 UE-to-network relay, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions (e.g., code and/or program code), when executed by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, process 1100 of FIG. 11, process 1200 of FIG. 12, and/or other processes as described herein. In some aspects, executing instructions may include running the instructions, converting the instructions, compiling the instructions, and/or interpreting the instructions, among other examples. A scheduler 246 may schedule UEs for data transmission on the downlink and/or uplink.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE (referred to herein as a relay user equipment or relay UE) may relay communications from another UE (referred to herein as a remote user equipment or remote UE) to a network or from the network to the remote UE. In some aspects, the relay UE may perform Layer 2 UE-to-network relaying, in which an adaptation layer in the Layer 2 stack of the relay UE performs forwarding of the remote UE's communications, as compared to Layer 3 relaying which may occur in the Internet Protocol (IP) layer. Communications between the relay UE and the remote UE may be referred to herein as sidelink communications. In some Layer 2 UE-to-network relaying applications, non-access-stratum (NAS) and RRC messages may be transparently transferred between the remote UE and the network using packet data convergence protocol (PDCP) end-to-end connections.

The ProSe Sidelink (PC5) interface may provide a sidelink interface between UEs. For example, V2X communications in accordance with NR Release 16 may be performed using a PC5 unicast control-plane stack, which may include a PC5 signaling (PC5-S) interface and a PC5 access-stratum (AS) (PC5-AS) interface, such as a PC5-RRC interface. UEs communicating using the PC5 interface may configure a unicast link context and exchange AS information using the PC5-S interface and the PC5-RRC interface. The UEs may be associated with a PC5 user-plane stack, which may include, for example, a PC5-service data adaptation protocol (SDAP) entity, a PC5-PDCP entity, and/or the like.

If Layer 2 relaying is performed via certain sidelink user-plane entities of the relay UE and/or the remote UE, such as the PC5-PDCP or the PC5-SDAP, then higher-layer resources of the relay UE and/or the remote UE may be consumed in connection with the Layer 2 relay, thereby increasing latency and computing resource consumption. Furthermore, performing Layer 2 relaying using the sidelink user-plane entities may stress the capacity of the sidelink between the UEs. Still further, a procedure for communication involved in setting up an RRC connection between the remote UE and a network via the relay UE may not be well defined.

Some techniques and apparatuses described herein provide signaling schemes and configurations for UE-to-network relaying between a remote UE and a relay UE that use PC5 interfaces. For example, some techniques and apparatuses described herein provide signaling schemes and configurations that do not use encapsulation of a message associated with establishing an RRC connection in a PC5-S container, thereby reducing reliance on the PC5-S interface and reducing resource consumption of the PC5-S entity. Furthermore, some techniques and apparatuses described herein provide schemes for user-plane architecture and communication between a relay UE and a remote UE, for example, without using PC5-SDAP or PC5-PDCP entities of the relay UE and the remote UE, thereby conserving computing resources of the relay UE and the remote UE.

Figure 3:
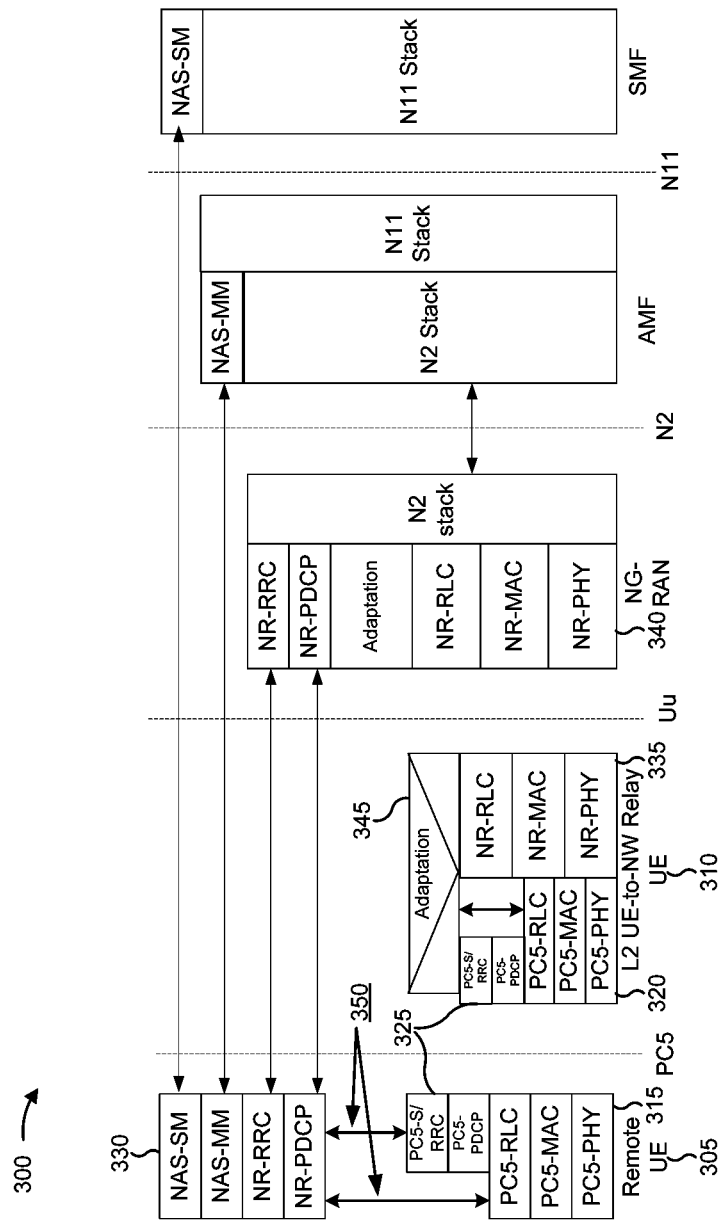
FIG. 3 is a diagram illustrating an example of a control-plane protocol architecture for a Layer 2 UE-to-network relay, in accordance with various aspects of the present disclosure.
Figure 4:
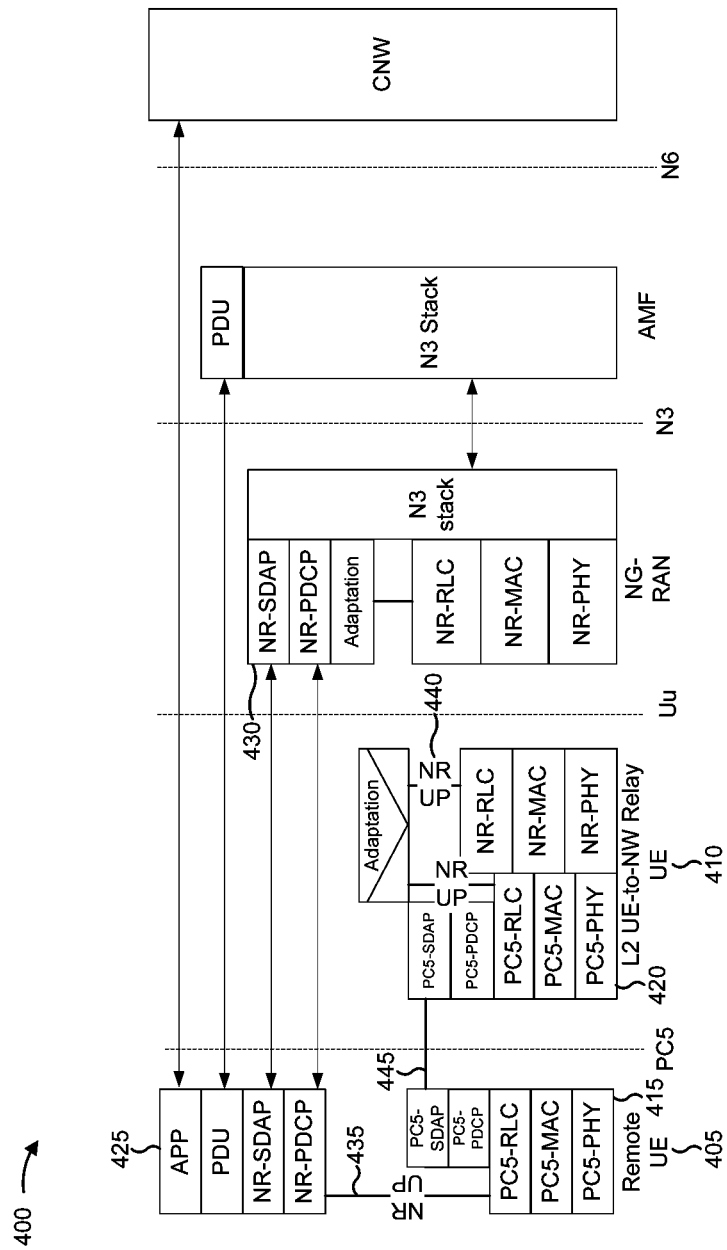
FIG. 4 is a diagram illustrating an example of a user-plane protocol architecture for a Layer 2 UE-to-network relay, in accordance with various aspects of the present disclosure.

FIG. 3 is a diagram illustrating an example of a control-plane protocol architecture 300 for a Layer 2 UE-to-network relay using Uu bearers that are not handled by a sidelink signaling entity or a sidelink radio resource control entity, such as that bypass the sidelink signaling entity or the sidelink radio resource control entity, in accordance with various aspects of the present disclosure. FIG. 4 is a diagram illustrating an example of a user-plane protocol architecture 400 for a Layer 2 UE-to-network relay using Uu bearers that are not handled by a sidelink signaling entity or a sidelink radio resource control entity, such as that bypass the sidelink signaling entity or the sidelink radio resource control entity, in accordance with various aspects of the present disclosure. For example, the control-plane protocol architecture 300 and the user-plane protocol architecture 400 may correspond to a remote UE (e.g., UE 120) shown by reference numbers 305 and 405 and a relay UE (e.g., UE 120) shown by reference numbers 310 and 410.

As shown in FIG. 3, in the control-plane, there may be a PC5 interface (e.g., a sidelink interface) between the remote UE and the relay UE, a Uu interface between the relay UE and a next generation radio access network (NG-RAN, also referred to herein as a 5G access network (5G-AN)), an N2 interface between the NG-RAN and an access and mobility management function (AMF) of the control-plane protocol architecture 300, and an N11 interface between the AMF and a session management function (SMF). One or more of the NG-RAN, the AMF, the SMF, or another device (e.g., BS 110) may be referred to herein as a network entity.

As shown in FIG. 4, there may be an N3 interface between the NG-RAN and a user-plane function (UPF) of the user-plane protocol architecture 400, and an N6 interface between the UPF and a core network (CNW).

As further shown, the remote UE and the relay UE may be associated with respective PC5 protocol stacks 315/320 and 415/420, enabling communication on the PC5 interface between the remote UE and the relay UE. The PC5 protocol stack may include a PC5 radio link control (RLC) component, a PC5 medium access control (MAC) component, a PC5 physical (PHY) component, and/or the like. Communications between the remote UE and the relay UE using the PC5 interface may be referred to as sidelink communications. The respective PC5 protocol stacks may be associated with one or more of PC5-S entities, PC5-RRC entities, or PC5-PDCP entities, as shown by reference number 325. The PC5-S entity may manage a sidelink signaling interface, such as a PC5-S interface.

As shown by reference number 330 of FIG. 3, the remote UE is associated with a non-access stratum (NAS) stack, which includes an NAS session management (NAS-SM) component, an NAS session management (NAS-SM) component, and one or more radio access components (e.g., an NR-RRC component and an NR-PDCP component). As shown by reference number 335 of FIG. 4, the relay UE is associated with a radio access stack, including an NR-RLC component, an NR-MAC component, and an NR-PHY component. Furthermore, the NG-RAN is associated with a radio access interface stack shown by reference number 340, which includes an NR-RLC component, an NR-MAC component, an NR-PHY component, an NR-RRC entity, and an NR-PDCP entity.

The adaptation layer entity of the relay UE, shown by reference number 345, may handle relaying from the remote UE to the network or from the network to the remote UE. As used herein, "the network" may refer to any one or more of the NG-RAN, the AMF, the SMF, the UPF, or the core network. In some aspects, the adaptation layer is referred to as an adaptation layer entity. In some aspects, the adaptation layer entity may be a separate entity between a radio link control entity and a packet data convergence entity. In some aspects, the adaptation layer entity may be logically part of the packet data convergence entity or the radio link control entity Communication between stacks of the remote UE is indicated by the lines shown by reference number 350. The line between the NR-PDCP entity and the PC5-RLC entity indicates how a message (e.g., an NR RRC message generated by the radio access protocol stack) that is not encapsulated in a sidelink signaling container, such as a PC5-S container, might be communicated from the radio access stack to the PC5 stack for transmission via the sidelink interface, or how a message that is not encapsulated in a PC5-S container might be communicated from the PC5 stack to the radio access stack after being received via the sidelink interface. Note that the line between the NR-PDCP entity and the PC5-RLC entity does not involve the PC5-S or PC5-PDCP entities, meaning that the PC5-S and PC5-PDCP entities do not handle such messages. A similar line is shown to indicate communication between the adaptation layer and the PC5-RLC entity that bypasses the PC5-S and PC5-PDCP entities of the relay UE. This is described in more detail in connection with FIG. 6.

The line between the NR-PDCP entity and the PC5-S or PC5/RRC entity indicates how a message (e.g., an NR RRC message generated by the radio access protocol stack) that is encapsulated in a PC5-S container might be communicated from the radio access stack to the PC5 stack for transmission via the sidelink interface, or how a message that is encapsulated in a PC5-S container might be communicated from the PC5 stack to the radio access stack after being received via the sidelink interface. Note that the line between the NR-PDCP entity and the PC5-RLC entity involves the PC5-S entity, meaning that the PC5-S entity may handle such messages. This is described in more detail in connection with FIG. 5.

As shown by reference number 425 of FIG. 4, the remote UE is associated with a user-plane protocol stack, which may include an application (APP) component, a protocol data unit (PDU) component, an NR-SDAP component, and an NR-PDCP component. Furthermore, the NG-RAN is associated with user-plane components shown by reference number 430, which include an NR-SDAP component and an NR-PDCP component. The NR-SDAP component and the NR-PDCP component may be referred to herein as radio access entities.

NR user-plane traffic (shown by a line indicated by "NR UP") may be transported between the NR-PDCP entity and the PC5-RLC component, as shown by reference number 435. Such NR user-plane traffic may be transported to the relay UE via one or more bearers, such as a data radio bearer (DRB) or signaling radio bearer (SRB) established as described in connection with FIGS. 5 and 6. As shown by reference number 440, the NR user-plane traffic may be provided from the PC5 stack of the relay UE to the adaptation component, and from the adaptation component to the radio access stack of the relay UE. The radio access stack of the relay UE may provide the NR user-plane traffic to the NG-RAN (not shown). This is described in more detail in connection with FIGS. 5 and 6. Sidelink communications, such as PC5 control messaging and/or the like, may occur between the PC5-SDAP components of the remote UE and the relay UE, as shown by reference number 445.

As indicated above, FIGS. 3 and 4 are provided as examples. Other examples may differ from what is described with respect to FIGS. 3 and 4.

Figure 5:
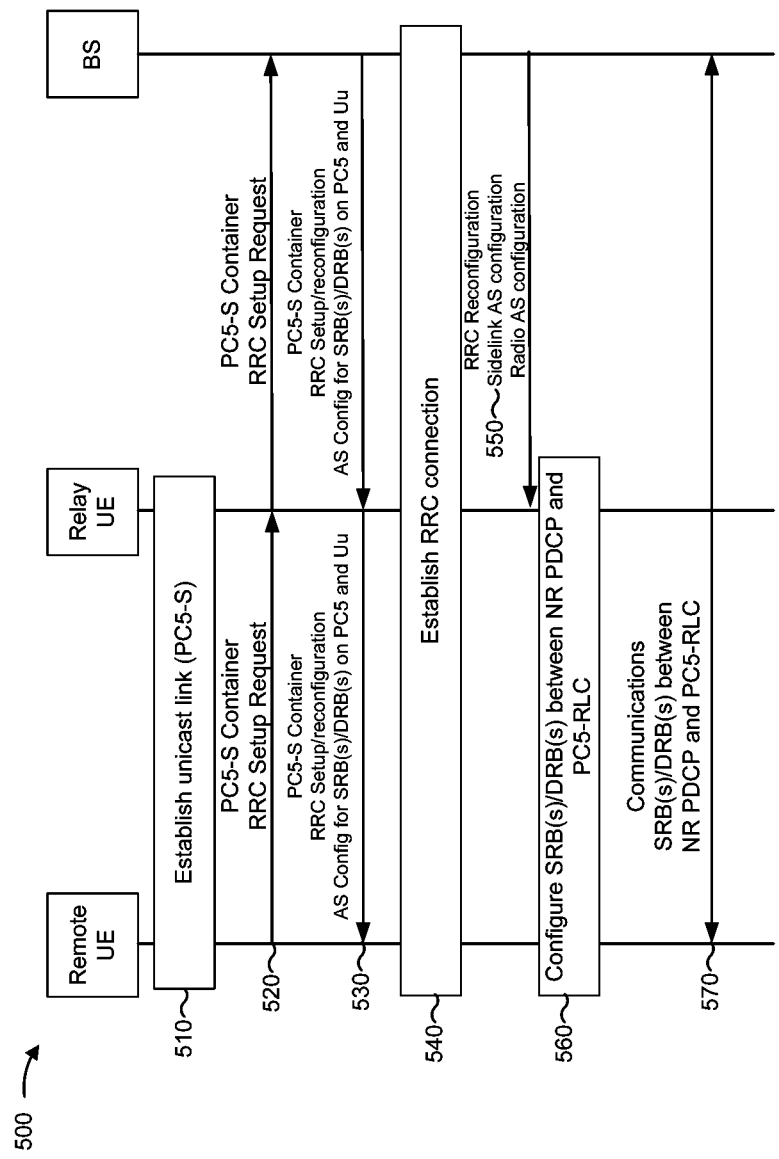
FIG. 5 is a diagram illustrating an example of configuration of Layer 2 UE-to-network relay communications using an encapsulated radio resource control message, in accordance with various aspects of the present disclosure.

FIG. 5 is a diagram illustrating an example 500 of configuration of Layer 2 UE-to-network relay communications using an encapsulated radio resource control message, in accordance with various aspects of the present disclosure. As shown, example 500 includes a remote UE (e.g., UE 120, remote UE 305, or remote UE 405), a relay UE (e.g., UE 120, relay UE 310, or relay UE 410), and a BS (e.g., BS 110). In some aspects, one or more operations described in example 500 as performed by the BS may be performed by a network entity. A network entity may include, for example, a BS, an NG-RAN, a UPF, an SMF, an AMF, a core network device, or the like.

As shown in FIG. 5, and by reference number 510, the remote UE and the relay UE may establish a unicast link (e.g., using antenna 252, DEMOD 254, MIMO detector 256, receive processor 258, controller/processor 280, transmit processor 264, TX MIMO processor 266, MOD 254, antenna 252, and/or the like). For example, the respective PC5-S entities of the remote UE and the relay UE (e.g., sidelink signaling entities) may be used on a PC5 link (e.g., associated with a sidelink signaling interface) for establishing the unicast link between the remote UE and the relay UE. In some aspects, the remote UE and the relay UE may establish an access-stratum (AS) configuration for the PC5 link. For example, the respective PC5-RRC entities of the remote UE and the relay UE may be used to establish the AS configuration for the unicast link (e.g., the PC5 link). In this case, the BS can modify the PC5-AS stack configuration for the unicast link. Once the unicast link is established, the unicast link may be referred to herein as an established sidelink unicast link.

As shown by reference number 520, the remote UE (e.g., using controller/processor 280, transmit processor 264, TX MIMO processor 266, MOD 254, antenna 252, and/or the like) may provide a message in a PC5-S container to the relay UE, and the relay UE (e.g., using controller/processor 280, transmit processor 264, TX MIMO processor 266, MOD 254, antenna 252, and/or the like) may provide the message to the BS. For example, the message may be provided via the unicast link. In this case, the message may be provided in a PC5-S message over a same PC5 bearer (e.g., a same PC5 SRB) used for PC5-S messages between the remote UE and the relay UE. As further shown, the message may include an RRC message, such as an NR RRC message associated with establishing an RRC connection. In some aspects, the message may be handled by an NR-PDCP entity and a PC5-S entity of the remote UE, such as shown by the link between the NR-PDCP entity and the PC5-S entity indicated by reference number 350 of FIG. 3.

In example 500, the message from the remote UE is encapsulated in a PC5-S container. Thus, a PC5-S entity of the remote UE (shown in FIG. 3) may handle communication of the message. A PC5-S entity of the relay UE may determine that the message is a remote UE NR RRC message based at least in part on information included in the PC5-S message, and may forward the message to the adaptation layer entity of the relay UE for forwarding to the BS over a Uu link. In this case, NR control-plane traffic may be handled by two PDCPs (for example, an NR-PDCP and a PC5-PDCP associated with protocol stacks including the NR-RRC, NR-PDCP, PC5-S, PC5-PDCP, PC5-RLC, PC5-MAC, and PC5-PHY). Furthermore, the remote UE's NR user-plane traffic may be handled by the NR-PDCP and the PC5-PDCP, which may be associated with protocol stacks including the NR-SDAP, NR-PDCP, PC5-SDAP, PC5-PDCP, PC5-RLC, PC5-MAC, and PC5-PHY.

As shown by reference number 530, the remote UE (e.g., using antenna 252, DEMOD 254, MIMO detector 256, receive processor 258, controller/processor 280, and/or the like) may receive, from the BS and via the relay UE, a PC5-S container including an RRC message, such as an RRC setup message or an RRC reconfiguration message. As shown by reference number 540, the remote UE may establish or reconfigure an RRC connection with the BS via the relay UE in accordance with the RRC message. In some aspects, the remote UE may receive the RRC reconfiguration message after establishment of the RRC connection. As further shown, the RRC message may include an AS configuration for one or more SRBs and/or one or more DRBs on the PC5 interface and the Uu interface. For example, the one or more SRBs and/or one or more DRBs may be configured for communication between the remote UE and the BS without overloading a PC5-S SRB between the remote UE and the relay UE, thus conserving resources of the relay UE. In some aspects, the one or more SRBs and/or the one or more DRBs are collectively referred to as "one or more bearers."

In some aspects, the AS configuration may include or may be received in association with a radio bearer configuration. For example, the AS configuration may include a radio bearer configuration for one or more Uu SRBs and/or DRBs, including an NR-PDCP configuration, an NR-SDAP configuration, a security configuration, and/or the like. In some aspects, the AS configuration may include a discontinuous reception configuration, an inactivity timer, and/or the like. For example, an NR RRC Uu information element (IE) may indicate a PC5 radio bearer configuration, a PC5-SDAP configuration, a PC5-PDCP configuration, a security configuration for the unicast link or another PC5 link, and/or the like. As another example, an IE may indicate a PC5 AS configuration (e.g., a sidelink access stratum configuration) for the one or more DRBs and/or SRBs. As yet another example, a PC5 AS configuration IE may indicate a logical channel configuration (e.g., an RLC configuration, a MAC configuration, a PHY configuration, and/or the like) corresponding to the one or more DRBs and/or SRBs that are to be added or modified. The above configuration may provide the use of NR-PDCP, PC5-RLC, PC5-MAC, and PC5-PHY entities for routing the remote UE's NR control-plane traffic and NR-SDAP, NR-PDCP, PC5-RLC, PC5-MAC, and PC5-PHY components for routing the remote UE's NR user-plane traffic. Thus, subsequent NR RRC or NAS messages may be communicated via the one or more SRBs and/or DRBs, thereby reducing load on the PC5-S SRB. In some aspects, the access stratum configuration may be received separately from the radio bearer configuration.

As shown by reference number 550, the BS 110 may provide an RRC message, such as an RRC reconfiguration message, to the UE 120. The RRC reconfiguration message may include sidelink AS configuration information (e.g., configuration information for one or more sidelink entities for the sidelink between the remote UE and the relay UE, such as for one or more logical channels associated with relay traffic), radio AS configuration information (e.g., for the radio access link between the BS and the relay UE), a Uu relaying access stratum configuration, a particular radio bearer configuration, a particular access stratum configuration, and/or the like. The relay UE may configure the sidelink and/or the radio link with the BS in accordance with the RRC message.

In some aspects, RRC messages that are used to set up (e.g., configure) the RRC connection either while transitioning from an idle mode state (e.g., RRC IDLE, referred to as an RRC idle state operation) to a connected mode state (e.g., RRC CONNECTED, referred to as an RRC connected state operation) or from an inactive mode state (e.g., RRC INACTIVE, referred to as an RRC inactive state operation) to the connected mode state may be transmitted over a preconfigured SRB or over a PC5-S/PC5-RRC SRB (e.g., without encapsulation or with encapsulation). Subsequently, after the BS has configured SRBs/DRBs for relaying operation, RRC messages, such as CP traffic, may be transmitted on the configured SRBs.

As shown by reference number 560, the remote UE and the relay UE (e.g., using antenna 252, DEMOD 254, MIMO detector 256, receive processor 258, controller/processor 280, transmit processor 264, TX MIMO processor 266, MOD 254, and/or the like) may configure the one or more SRBs and/or the one or more DRBs between the NR-PDCP and the PC5-RLC. For example, the remote UE and the relay UE may configure the one or more SRBs and/or the one or more DRBs in accordance with the configuration information described above. In some aspects, the configuration shown by reference number 560 may refer to an initial configuration (e.g., establishment). In some aspects, the configuration shown by reference number 560 may refer to a reconfiguration of at least one bearer of the one or more SRBs and/or the one or more DRBs. In some aspects, "configuring a bearer" may refer to configuring an NR-SDAP and/or NR-PDCP entity for the bearer, mapping a PC5 logical channel to the bearer, and/or the like. Furthermore, a PC5-RLC component of the remote UE may be configured to handle the NR-PDCP protocol data unit (PDU) format, which may enable the handling of NR control-plane and user-plane PDCP PDUs.

As shown by reference number 570, the remote UE and the BS (e.g., using controller/processor 280, transmit processor 264, TX MIMO processor 266, MOD 254, antenna 252, controller/processor 240, transmit processor 220, TX MIMO processor 230, MOD 232, antenna 234, and/or the like) may communicate via the relay UE using the one or more SRBs and/or the one or more DRBs. For example, an NR-PDCP entity and a PC5-RLC component of the remote UE may handle user-plane communications of the remote UE, as shown by reference number 435 of FIG. 4. Thus, the remote UE and the BS may configure one or more bearers, separate from a PC5-S bearer of the remote UE, for communication via the relay UE. This reduces load on the PC5-S bearer and conserves computing resources of the relay UE.

In some aspects, the BS (e.g., using controller/processor 240, transmit processor 220, TX MIMO processor 230, MOD 232, antenna 234, and/or the like) may configure a bearer for the PC5 interface between the remote UE and the relay UE. For example, the bearer may be used for sidelink communications between the remote UE and the relay UE, such as shown by reference number 445 of FIG. 4. In this case, in some aspects, such communications may not be relayed to the BS. The BS may provide a configuration for the bearer to the remote UE via one or more NR RRC messages, which may include one or more IEs for a PC5 radio bearer configuration and a PC5 access stratum configuration, which are described in more detail above. The bearer may be handled by a PC5-SDAP entity and/or a PC5-PDCP entity of the remote UE and/or the relay UE, and may be provided to a PC5-RLC/PC5-MAC/PC5-PHY entity for sidelink communication between the remote UE and the relay UE.

As indicated above, FIG. 5 is provided as an example. Other examples may differ from what is described with respect to FIG. 5.

Figure 6:
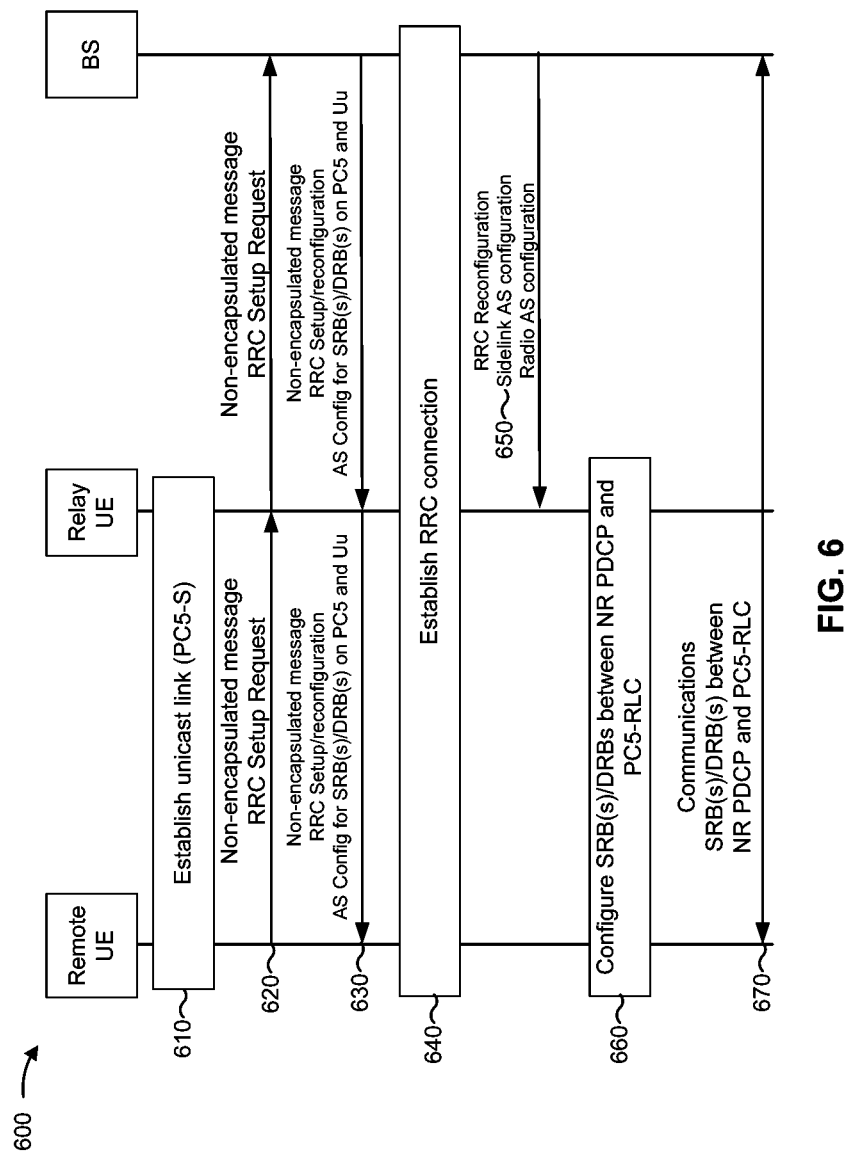
FIG. 6 is a diagram illustrating an example of configuration of Layer 2 UE-to-network relay communications using a non-encapsulated radio resource control message, in accordance with various aspects of the present disclosure.

FIG. 6 is a diagram illustrating an example 600 of configuration of Layer 2 UE-to-network relay communications using a non-encapsulated radio resource control message, in accordance with various aspects of the present disclosure. As shown, example 600 includes a remote UE (e.g., UE 120, remote UE 305, or remote UE 405), a relay UE (e.g., UE 120, relay UE 310, or relay UE 410), and a BS (e.g., BS 110). In some aspects, one or more operations described as performed by the BS may be performed by a network entity. A network entity may include, for example, a BS, an NG-RAN, a UPF, an SMF, an AMF, a core network device, or the like.

As shown in FIG. 6, and by reference number 610, the remote UE may establish a unicast link with the relay UE. The establishment of the unicast link is described in more detail in connection with FIG. 5.

As shown by reference number 620, the remote UE may provide a non-encapsulated message to the relay UE, and the relay UE may forward the non-encapsulated message to the BS. As shown by reference number 630, the remote UE may receive, from the BS via the relay UE, a non-encapsulated message including an RRC setup or RRC reconfiguration message. The non-encapsulated message may be referred to herein as a radio access connection establishment message, and may carry information associated with setting up a connection (e.g., a radio access connection), which may be referred to herein as a radio access connection. For example, a non-encapsulated message may not be encapsulated in a PC5-S container (e.g., a container that is based at least in part on a PC5-S protocol) or message. In this case, the non-encapsulated message may be communicated on an SRB that is handled by the NR-PDCP entity of the remote UE and/or the relay UE, such as SRB0 associated with radio resource control messaging. In some aspects, the SRB is referred to herein as a first SRB. In some aspects, the SRB may be associated with one or more logical channels that are configured for operation with the PC5-RLC/MAC/PHY stack, such as one or more logical channels configured for NR RRC messaging. In such a case, the one or more logical channels may be pre-configured or defined, for example, before the message is communicated (e.g., in a wireless communication standard, by a manufacturer or provider configuration, or the like). A logical channel that is configured for operation with the PC5-RLC/MAC/PHY stack may be referred to herein as a sidelink logical channel.

As shown, the non-encapsulated message may carry an AS configuration. As mentioned above, the AS configuration may include, or may be associated with, a radio bearer configuration. For example, the BS may transmit the AS configuration and the radio bearer configuration to the remote UE via the relay UE.

On the uplink, a message on the one or more logical channels may be received by a PC5-RLC component of the relay UE, and the PC5-RLC component may pass the message to the adaptation layer entity of the relay UE. The adaptation layer may pass the message to an NR-RLC component of the relay UE, and the NR-RLC component may relay the message to the NG-RAN on the Uu link (e.g., the NR-RLC component of the NG-RAN). On the downlink, the NR-RLC component of the relay UE may receive the message, and the NR-RLC component may pass the message to the adaptation layer entity of the relay UE. The adaptation layer may pass the message to the PC5-RLC component of the relay UE, and the PC5-RLC component may relay the message to the remote UE.

After communication of the RRC messages (e.g., the RRC setup request, the RRC setup message, and/or the RRC reconfiguration message), the remote UE, the relay UE, and the BS may establish and/or reconfigure the RRC connection, as shown by reference number 640. The RRC connection may be referred to herein as a radio access connection or a connection. In some aspects, the BS may provide an RRC message, such as an RRC reconfiguration message, to the relay UE, as shown by reference number 650. The RRC reconfiguration message may include an AS configuration and/or a radio bearer configuration, such as sidelink AS configuration information (e.g., configuration information for one or more sidelink entities for the sidelink between the remote UE and the relay UE), radio AS configuration information (e.g., for the radio access link between the BS and the relay UE), a Uu relaying access stratum configuration, or the like. The relay UE may configure the sidelink and/or the radio link with the BS in accordance with the RRC message.

As shown by reference number 660, the remote UE and the relay UE may configure one or more SRBs and/or DRBs based at least in part on the AS configuration information included in the non-encapsulated message indicated by reference number 630. As shown by reference number 670, the remote UE and the BS may communicate via the one or more SRBs and/or DRBs. These operations are described in more detail in connection with reference numbers 540, 550, 560, and 570 of FIG. 5.

As indicated above, FIG. 6 is provided as an example. Other examples may differ from what is described with respect to FIG. 6.

Figure 7:
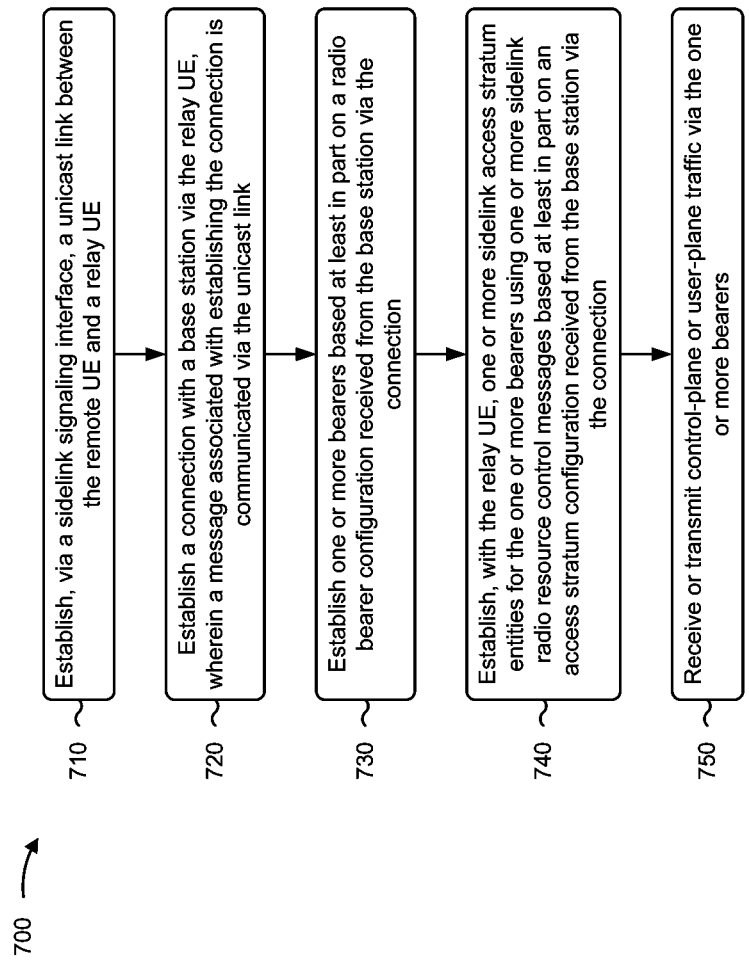
FIGS. 7-12 are diagrams illustrating example processes performed, for example, by a user equipment or a network device, in accordance with various aspects of the present disclosure.

FIG. 7 is a diagram illustrating an example process 700 performed, for example, by a remote UE, in accordance with various aspects of the present disclosure. Example process 700 is an example where the remote UE (e.g., UE 120 and/or the like) performs operations associated with layer 2 user equipment-to-network relay.

As shown in FIG. 7, in some aspects, process 700 may include establishing, via a sidelink signaling interface, a unicast link between the remote UE and a relay UE (block 710). For example, the remote UE (e.g., using controller/processor 280, transmit processor 264, TX MIMO processor 266, MOD 254, antenna 252, and/or the like) may establish, via a sidelink signaling interface, a unicast link between the remote UE and a relay UE, as described above.

As further shown in FIG. 7, in some aspects, process 700 may include establishing a connection with a base station via the relay UE, wherein a message associated with establishing the connection is communicated via the unicast link (block 720). For example, the remote UE (e.g., using controller/processor 280, transmit processor 264, TX MIMO processor 266, MOD 254, antenna 252, and/or the like) may establish a connection with a base station via the relay UE, as described above. In some aspects, a message associated with establishing the connection is communicated via the unicast link.

As further shown in FIG. 7, in some aspects, process 700 may include establishing one or more bearers based at least in part on a radio bearer configuration received from the base station via the connection (block 730). For example, the remote UE (e.g., using controller/processor 280, transmit processor 264, TX MIMO processor 266, MOD 254, antenna 252, and/or the like) may establish one or more bearers based at least in part on a radio bearer configuration received from the base station via the connection, as described above.

As further shown in FIG. 7, in some aspects, process 700 may include establishing, with the relay UE, one or more sidelink access stratum entities for the one or more bearers using one or more sidelink radio resource control messages based at least in part on an access stratum configuration received from the base station via the connection (block 740). For example, the remote UE (e.g., using controller/processor 280, transmit processor 264, TX MIMO processor 266, MOD 254, antenna 252, and/or the like) may establish, with the relay UE, one or more sidelink access stratum entities for the one or more bearers using one or more sidelink radio resource control messages based at least in part on an access stratum configuration received from the base station via the connection, as described above.

As further shown in FIG. 7, in some aspects, process 700 may include receiving or transmitting control-plane or user-plane traffic via the one or more bearers (block 750). For example, the remote UE (e.g., using antenna 252, DEMOD 254, MIMO detector 256, receive processor 258, controller/processor 280, transmit processor 264, TX MIMO processor 266, MOD 254, and/or the like) may receive or transmit control-plane or user-plane traffic via the one or more bearers, as described above.

Process 700 may include additional aspects, such as any single aspect or any combination of aspects described below and/or in connection with one or more other processes described elsewhere herein.

In a first aspect, process 700 includes communicating the message via a signaling radio bearer that is configured with one or more sidelink logical channels for communication associated with establishing the connection, wherein the signaling radio bearer is different than a signaling radio bearer used to configure the unicast link. In a second aspect, alone or in combination with the first aspect, the signaling radio bearer is handled by a radio access entity of the remote UE. In a third aspect, alone or in combination with one or more of the first and second aspects, the radio access entity comprises a control-plane radio access packet data convergence protocol entity.

In a third aspect, alone or in combination with one or more of the first and second aspects, the remote UE is associated with a sidelink signaling entity that handles the sidelink signaling interface, and the unicast link is set up by the sidelink signaling entity. In a fourth aspect, alone or in combination with one or more of the first through third aspects, the message is communicated on a logical channel, of the one or more sidelink logical channels, and the message is communicated without encapsulating the message in a sidelink signaling container. In a fifth aspect, alone or in combination with one or more of the first through fourth aspects, the message comprises a radio resource control message associated with transitioning from radio resource control idle state or radio resource control inactive state operation to radio resource control connected state operation.

In a sixth aspect, alone or in combination with one or more of the first through fifth aspects, the access stratum configuration is associated with a radio bearer configuration information element for the one or more bearers, and the one or more bearers comprise at least one of a signaling radio bearer or a data radio bearer. In a seventh aspect, alone or in combination with one or more of the first through sixth aspects, the radio bearer configuration information element indicates at least one of a configuration for a user-plane radio access entity of the remote UE, a configuration for a control-plane radio access entity of the remote UE, or a security configuration for the one or more bearers.

In an eighth aspect, alone or in combination with one or more of the first through seventh aspects, the access stratum configuration includes an information element indicating a sidelink radio link control entity, a medium access control entity, and a physical layer entity configuration for the one or more bearers. In a ninth aspect, alone or in combination with one or more of the first through eighth aspects, the one or more bearers are handled by a radio access packet data convergence protocol entity or a radio access service data adaptation protocol entity, based at least in part on the radio bearer configuration information element.

In a tenth aspect, alone or in combination with one or more of the first through ninth aspects, a sidelink radio link control entity of the remote UE is configured to handle a protocol data unit format associated with the radio access packet data convergence protocol entity.

In an eleventh aspect, alone or in combination with one or more of the first through tenth aspects, process 700 includes receiving configuration information for a sidelink bearer between the remote UE and the relay UE; establishing the sidelink bearer with the relay UE for the unicast link using one or more sidelink radio resource control messages; and configuring the sidelink bearer in accordance with the configuration information, wherein the sidelink bearer is handled by a sidelink packet data convergence protocol entity or a sidelink service data adaptation protocol entity of the remote UE.

In a twelfth aspect, alone or in combination with one or more of the first through eleventh aspects, the access stratum configuration is received with the message. In a thirteenth aspect, alone or in combination with one or more of the first through twelfth aspects, the message is transmitted or received via the sidelink signaling interface. In a fourteenth aspect, alone or in combination with one or more of the first through thirteenth aspects, the message is encapsulated in a sidelink signaling container.

In a fifteenth aspect, alone or in combination with one or more of the first through fourteenth aspects, establishing the connection with the base station is based at least in part on a parameter indicating a discontinuous reception configuration or an inactivity timer for the remote UE, and wherein the method 700 further comprises maintaining the connection with the base station based at least in part on the parameter.

In a sixteenth aspect, alone or in combination with one or more of the first through fifteenth aspects, the message is transmitted or received without encapsulation in a sidelink signaling container, the message is transmitted or received via a signaling radio bearer that is configured with one or more sidelink logical channels for communication associated with establishing the connection, the signaling radio bearer is different than a signaling radio bearer used to configure the unicast link, and the signaling radio bearer is handled by a control-plane radio access packet data convergence protocol entity.

In a seventeenth aspect, alone or in combination with one or more of the first through sixteenth aspects, the control-plane or user-plane traffic bypasses a sidelink protocol data convergence protocol entity or a service data adaptation protocol entity of the remote UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
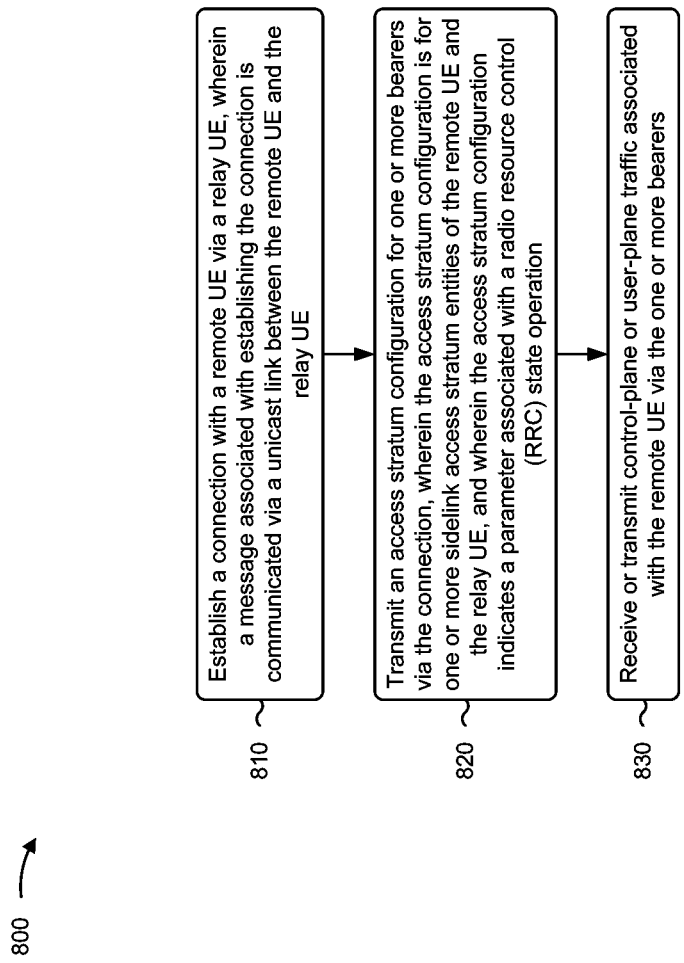

FIG. 8 is a diagram illustrating an example process 800 performed, for example, by a base station, in accordance with various aspects of the present disclosure. Example process 800 is an example where the base station (e.g., base station 110 and/or the like) performs operations associated with Layer 2 user equipment-to-network relay. In some aspects, the operations of example 800 may be performed by a network entity.

As shown in FIG. 8, in some aspects, process 800 may include establishing a connection with a remote UE via a relay UE, wherein a message associated with establishing the connection is communicated via a unicast link between the remote UE and the relay UE (block 810). For example, the base station (e.g., using controller/processor 240, transmit processor 220, TX MIMO processor 230, MOD 232, antenna 234, and/or the like) may establish a connection with a remote UE via a relay UE, as described above. In some aspects, a message associated with establishing the connection is communicated via a unicast link between the remote UE and the relay UE.

As further shown in FIG. 8, in some aspects, process 800 may include transmitting a radio bearer configuration and an access stratum configuration for one or more bearers via the connection, wherein the access stratum configuration is for one or more sidelink access stratum entities of the remote UE and the relay UE, and wherein the access stratum configuration indicates a parameter associated with a radio resource control (RRC) state operation (block 820). For example, the base station (e.g., using controller/processor 240, transmit processor 220, TX MIMO processor 230, MOD 232, antenna 234, and/or the like) may transmit a radio bearer configuration and an access stratum configuration for one or more bearers via the connection, as described above. In some aspects, the access stratum configuration is for one or more sidelink access stratum entities of the remote UE and the relay UE. In some aspects, the access stratum configuration indicates a parameter associated with a radio resource control (RRC) state operation.

As further shown in FIG. 8, in some aspects, process 800 may include receiving or transmitting control-plane or user-plane traffic associated with the remote UE via the one or more bearers (block 830). For example, the base station (e.g., using antenna 234, DEMOD 232, MIMO detector 236, receive processor 238, controller/processor 240, transmit processor 220, TX MIMO processor 230, MOD 232, and/or the like) may receive or transmit control-plane or user-plane traffic associated with the remote UE via the one or more bearers, as described above.

Process 800 may include additional aspects, such as any single aspect or any combination of aspects described below and/or in connection with one or more other processes described elsewhere herein.

In a first aspect, process 800 includes configuring a signaling radio bearer used for the message prior to establishment of the unicast link, wherein the signaling radio bearer is different than a signaling radio bearer used to configure the unicast link. In a second aspect, alone or in combination with the first aspect, the message comprises a radio resource control message, and the message is transmitted without encapsulating the message in a sidelink signaling container. In a third aspect, alone or in combination with one or more of the first and second aspects, the access stratum configuration is transmitted with the radio resource control message. In a fourth aspect, alone or in combination with one or more of the first through third aspects, the access stratum configuration includes an information element indicating a sidelink radio link control entity, a sidelink medium access control entity, and a sidelink physical layer entity configuration for the one or more bearers In a fifth aspect, alone or in combination with one or more of the first and fourth aspects, process 800 includes transmitting configuration information for a sidelink bearer between the remote UE and the relay UE, wherein the configuration information for the sidelink bearer is associated with configuring a sidelink packet data convergence protocol entity or a sidelink service data adaptation protocol entity of the remote UE to handle the sidelink bearer.

In a sixth aspect, alone or in combination with one or more of the first through fifth aspects, access stratum configuration is associated with a radio bearer configuration information element for the one or more bearers, and wherein the one or more bearers comprise at least one of a signaling radio bearer or a data radio bearer.

In a seventh aspect, alone or in combination with one or more of the first through sixth aspects, the radio bearer configuration information element indicates at least one of a configuration for a control-plane radio access entity of the remote UE, a configuration for a user-plane radio access entity of the remote UE, or a security configuration for the one or more bearers.

In an eighth aspect, alone or in combination with one or more of the first through seventh aspects, the one or more bearers are handled by a radio access packet data convergence protocol entity or a radio access service data adaptation protocol entity.

In a ninth aspect, alone or in combination with one or more of the first through eighth aspects, a sidelink radio link control entity of the remote UE is configured to handle a protocol data unit format associated with the radio access packet data convergence protocol entity.

In a tenth aspect, alone or in combination with one or more of the first through ninth aspects, the process 800 includes transmitting, to the relay UE, a radio access stratum configuration that is provided via a radio resource control reconfiguration message, and wherein the radio resource control reconfiguration message includes an adaptation layer entity configuration.

In an eleventh aspect, alone or in combination with one or more of the first through tenth aspects, the radio access stratum configuration indicates a configuration for at least one of a radio link control entity, a medium access control entity, a physical layer entity, or an adaptation layer entity. In a twelfth aspect, alone or in combination with one or more of the first through eleventh aspects, the adaptation layer entity is separate from and between the radio link control entity and a packet data convergence entity. In a thirteenth aspect, alone or in combination with one or more of the first through twelfth aspects, the adaptation layer is part of a packet data convergence entity or the radio link control entity.

In a fourteenth aspect, alone or in combination with one or more of the first through thirteenth aspects, the process 800 may include transmitting configuration information for a sidelink bearer between the remote UE and the relay UE, wherein the configuration for the sidelink bearer is associated with configuring a sidelink packet data convergence protocol entity or a sidelink service data adaptation protocol entity of the remote UE to handle the sidelink bearer.

In a fifteenth aspect, alone or in combination with one or more of the first through fourteenth aspects, the message is encapsulated in a sidelink signaling container. In a sixteenth aspect, alone or in combination with one or more of the first through fifteenth aspects, the parameter associated with the RRC state operation indicates a discontinuous reception configuration or an inactivity timer for the remote UE.

In a seventeenth aspect, alone or in combination with one or more of the first through sixteenth aspects, the message is transmitted or received without encapsulation in a sidelink signaling container, wherein the message is transmitted or received via a signaling radio bearer that is configured with one or more sidelink logical channels for communication associated with establishing the connection, wherein the signaling radio bearer is different than a signaling radio bearer used to configure the unicast link, and wherein the signaling radio bearer is handled by a control-plane radio access packet data convergence protocol entity.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
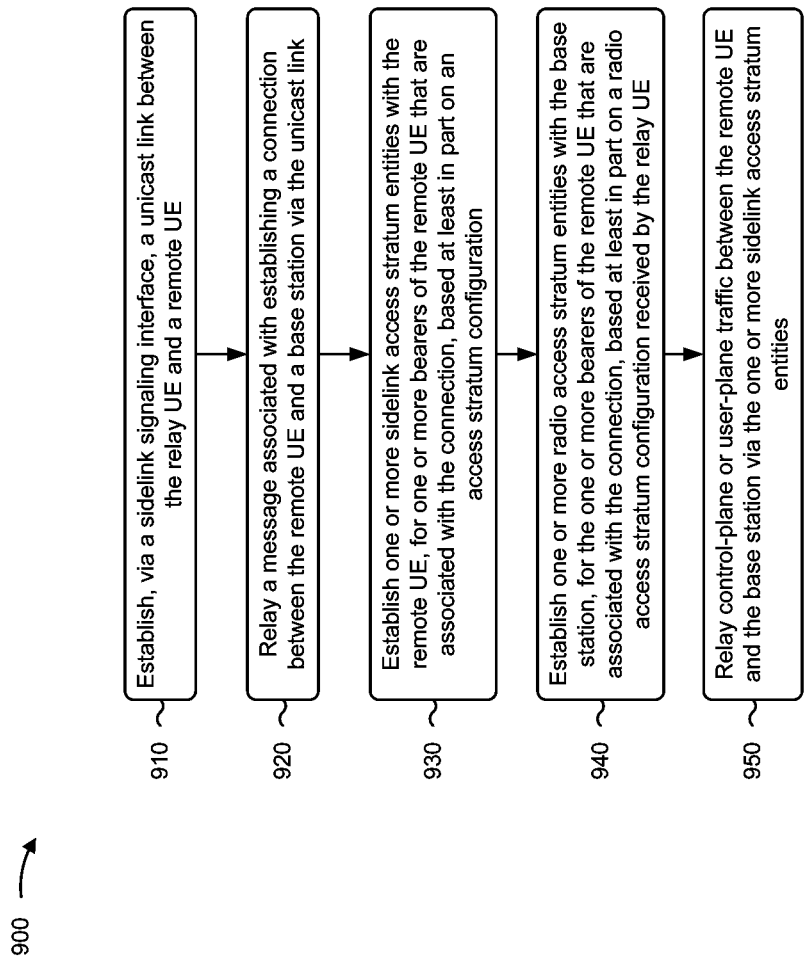

FIG. 9 is a diagram illustrating an example process 900 performed, for example, by a relay UE, in accordance with various aspects of the present disclosure. Example process 900 is an example where the relay UE (e.g., UE 120 and/or the like) performs operations associated with Layer 2 user equipment-to-network relay.

As shown in FIG. 9, in some aspects, process 900 may include establishing, via a sidelink signaling interface, a unicast link between the relay UE and a remote UE (block 910). For example, the relay UE (e.g., using controller/processor 280, transmit processor 264, TX MIMO processor 266, MOD 254, antenna 252, and/or the like) may establish, via a sidelink signaling interface, a unicast link between the relay UE and a remote UE, as described above.

As further shown in FIG. 9, in some aspects, process 900 may include relaying a message associated with establishing a connection between the remote UE and a base station via the unicast link (block 920). For example, the relay UE (e.g., using controller/processor 280, transmit processor 264, TX MIMO processor 266, MOD 254, antenna 252, and/or the like) may relay a message associated with establishing a connection between the remote UE and a base station via the unicast link, as described above.

As further shown in FIG. 9, in some aspects, process 900 may include establishing one or more sidelink access stratum entities with the remote UE, for one or more bearers of the remote UE that are associated with the connection, based at least in part on a sidelink access stratum configuration (block 930). For example, the relay UE (e.g., using controller/processor 280, transmit processor 264, TX MIMO processor 266, MOD 254, antenna 252, and/or the like) may establish one or more sidelink access stratum entities with the remote UE, for one or more bearers of the remote UE that are associated with the connection, based at least in part on a sidelink access stratum configuration, as described above.

As further shown in FIG. 9, in some aspects, process 900 may include establishing one or more radio access stratum entities with the base station, for the one or more bearers of the remote UE that are associated with the connection, based at least in part on a radio access stratum configuration received by the relay UE (block 940). For example, the relay UE (e.g., using controller/processor 280, transmit processor 264, TX MIMO processor 266, MOD 254, antenna 252, and/or the like) may establish one or more radio access stratum entities with the base station, for the one or more bearers of the remote UE that are associated with the connection, based at least in part on a radio access stratum configuration received by the relay UE, as described above.

As further shown in FIG. 9, in some aspects, process 900 may include relaying control-plane or user-plane traffic between the remote UE and the base station via the one or more sidelink access stratum entities and the one or more radio access stratum entities (block 950). For example, the relay UE (e.g., using controller/processor 280, transmit processor 264, TX MIMO processor 266, MOD 254, antenna 252, and/or the like) may relay control-plane or user-plane traffic between the remote UE and the base station via the one or more sidelink access stratum entities and the one or more radio access stratum entities, as described above.

Process 900 may include additional aspects, such as any single aspect or any combination of aspects described below and/or in connection with one or more other processes described elsewhere herein.

In a first aspect, the sidelink access stratum configuration relates to one or more logical channels associated with relay traffic, and the access stratum configuration is received from the remote UE via a sidelink radio resource control configuration.

In a second aspect, alone or in combination with the first aspect, the sidelink access stratum configuration and the radio access stratum configuration relate to one or more logical channels, and the access stratum configuration is received from the base station via a radio resource control reconfiguration message that indicates access stratum configuration information for the one or more logical channels.

In a third aspect, alone or in combination with one or more of the first and second aspects, the radio access stratum configuration indicates a configuration for at least one of a radio link control entity, a medium access control entity, a physical layer entity, or an adaptation layer entity. In a fourth aspect, alone or in combination with one or more of the first through third aspects, the adaptation layer entity is separate from and between the radio link control entity and a packet data convergence entity. In a fifth aspect, alone or in combination with one or more of the first through fourth aspects, the adaptation layer is part of a packet data convergence entity or the radio link control entity.

In a sixth aspect, alone or in combination with one or more of the first and fifth aspects, the one or more sidelink access stratum entities are associated with relay traffic based at least in part on a configuration of the one or more sidelink access stratum entities, and relaying control-plane or user-plane traffic between the remote UE and the base station via the one or more sidelink access stratum entities and the one or more radio access stratum entities further comprises forwarding the control-plane or user-plane traffic to an adaptation layer entity of the relay UE based at least in part on the control-plane or user-plane traffic being associated with the one or more sidelink access stratum entities.

In a seventh aspect, alone or in combination with one or more of the first through sixth aspects, the one or more sidelink access stratum entities are associated with relay traffic based at least in part on a logical channel identifier associated with the one or more sidelink access stratum entities.

In an eighth aspect, alone or in combination with one or more of the first through seventh aspects, an adaptation layer entity of the relay UE forwards the control-plane or user-plane traffic from the one or more sidelink access stratum entities to the one or more radio access stratum entities based at least in part on the logical channel identifier. In a ninth aspect, alone or in combination with one or more of the first through eighth aspects, the relay UE is associated with a sidelink signaling entity that handles the sidelink signaling interface, and the unicast link is configured by the sidelink signaling entity.

In a tenth aspect, alone or in combination with one or more of the first through ninth aspects, the message comprises a radio resource control message.

In an eleventh aspect, alone or in combination with one or more of the first through tenth aspects, process 900 includes receiving configuration information for a sidelink bearer between the remote UE and the relay UE; establishing the sidelink bearer with the relay UE for the unicast link using one or more sidelink radio resource control messages; and configuring the sidelink bearer in accordance with the configuration information, wherein the sidelink bearer is handled by a sidelink packet data convergence protocol entity or a sidelink service data adaptation protocol entity of the relay UE.

In a twelfth aspect, alone or in combination with one or more of the first through eleventh aspects, the one or more bearers are associated with a user-plane or control-plane radio access entity of the remote UE. In a thirteenth aspect, alone or in combination with one or more of the first through twelfth aspects, the message is encapsulated in a sidelink signaling container. In a fourteenth aspect, alone or in combination with one or more of the first through thirteenth aspects, the control-plane or user-plane traffic bypasses a sidelink protocol data convergence protocol entity or a service data adaptation protocol entity of the relay UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
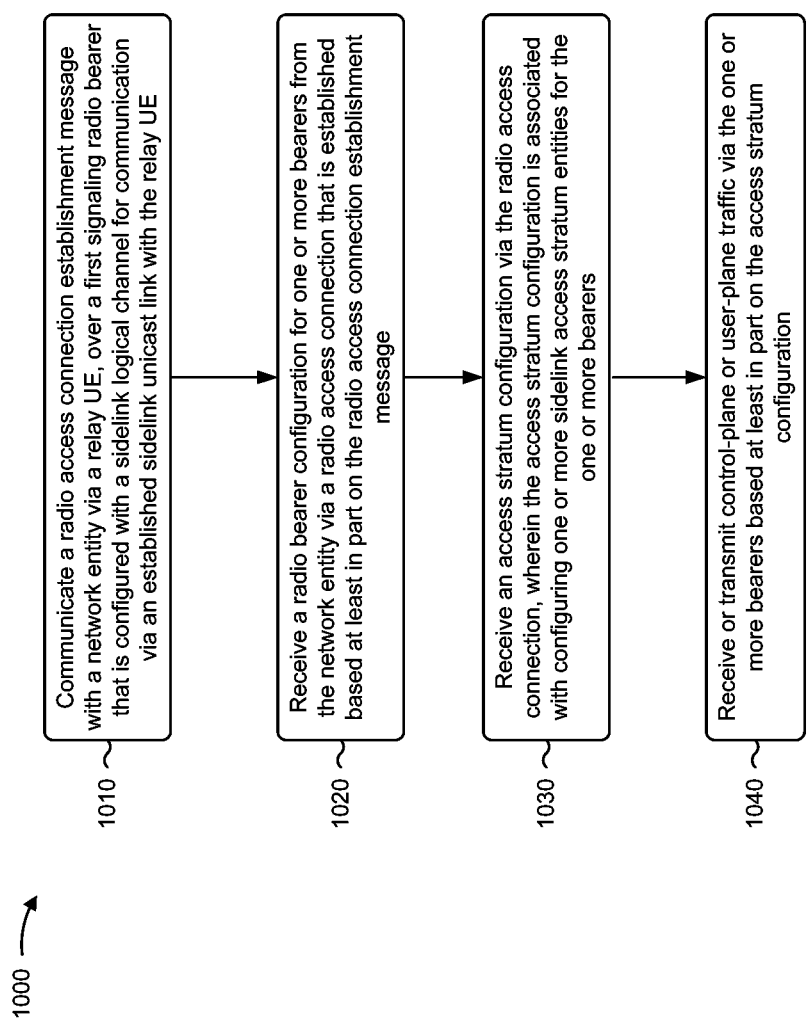

FIG. 10 is a diagram illustrating an example process 1000 performed, for example, by a remote UE, in accordance with various aspects of the present disclosure. Example process 1000 is an example where the remote UE (e.g., UE 120) performs operations associated with user equipment to network relay.

As shown in FIG. 10, in some aspects, process 1000 may include communicating a radio access connection establishment message with a network entity via a relay UE, over a first signaling radio bearer that is configured with a sidelink logical channel for communication via an established sidelink unicast link with the relay UE (block 1010). For example, the remote UE (e.g., using transmission component 1312 or reception component 1304, depicted in FIG. 13) may communicate a radio access connection establishment message with a network entity via a relay UE, over a first signaling radio bearer that is configured with a sidelink logical channel for communication via an established sidelink unicast link with the relay UE, as described above.

As further shown in FIG. 10, in some aspects, process 1000 may include receiving a radio bearer configuration for one or more bearers from the network entity via a radio access connection that is established based at least in part on the radio access connection establishment message (block 1020). For example, the remote UE (e.g., using reception component 1304, depicted in FIG. 13) may receive a radio bearer configuration for one or more bearers from the network entity via a radio access connection that is established based at least in part on the radio access connection establishment message, as described above.

As further shown in FIG. 10, in some aspects, process 1000 may include receiving an access stratum configuration via the radio access connection, wherein the access stratum configuration is associated with configuring one or more sidelink access stratum entities for the one or more bearers (block 1030). For example, the remote UE (e.g., using reception component 1304, depicted in FIG. 13) may receive an access stratum configuration via the radio access connection, wherein the access stratum configuration is associated with configuring one or more sidelink access stratum entities for the one or more bearers, as described above.

As further shown in FIG. 10, in some aspects, process 1000 may include receiving or transmitting control-plane or user-plane traffic via the one or more bearers based at least in part on the access stratum configuration (block 1040). For example, the remote UE (e.g., using reception component 1304 or transmission component 1312, depicted in FIG. 13) may receive or transmit control-plane or user-plane traffic via the one or more bearers based at least in part on the access stratum configuration, as described above.

Process 1000 may include additional aspects, such as any single aspect or any combination of aspects described below and/or in connection with one or more other processes described elsewhere herein.

In a first aspect, the first signaling radio bearer is a signaling radio access bearer 0 (SRB0) associated with radio resource control messaging and is handled by a radio access entity of the remote UE.

In a second aspect, alone or in combination with the first aspect, the radio access entity comprises a control-plane radio access packet data convergence protocol entity.

In a third aspect, alone or in combination with one or more of the first and second aspects, the remote UE is associated with a sidelink signaling entity that handles a sidelink signaling interface of the remote UE, and the established sidelink unicast link is set up by the sidelink signaling entity.

In a fourth aspect, alone or in combination with one or more of the first through third aspects, the first signaling radio bearer is different than a signaling radio bearer used to set up the established sidelink unicast link.

In a fifth aspect, alone or in combination with one or more of the first through fourth aspects, a configuration for the first signaling radio bearer and the sidelink logical channel is pre-configured or defined.

In a sixth aspect, alone or in combination with one or more of the first through fifth aspects, the radio access connection establishment message is communicated without encapsulating the radio access connection establishment message in a sidelink signaling container.

In a seventh aspect, alone or in combination with one or more of the first through sixth aspects, the radio access connection establishment message comprises a radio resource control message associated with transitioning from a radio resource control idle state operation or a radio resource control inactive state operation to a radio resource control connected state operation.

In an eighth aspect, alone or in combination with one or more of the first through seventh aspects, the control-plane or user-plane traffic bypasses a sidelink protocol data convergence protocol entity or a service data adaptation protocol entity of the remote UE.

In a ninth aspect, alone or in combination with one or more of the first through eighth aspects, the access stratum configuration is associated with a radio bearer configuration information element for the one or more bearers, and the one or more bearers comprise at least one of a signaling radio bearer or a data radio bearer.

In a tenth aspect, alone or in combination with one or more of the first through ninth aspects, the radio bearer configuration information element indicates at least one of a configuration for a user-plane radio access entity of the remote UE, a configuration for a control-plane radio access entity of the remote UE, or a security configuration for the one or more bearers.

In an eleventh aspect, alone or in combination with one or more of the first through tenth aspects, the access stratum configuration includes an information element indicating at least one of a sidelink radio link control entity, a medium access control entity, or a physical layer entity configuration for the one or more bearers.

In a twelfth aspect, alone or in combination with one or more of the first through eleventh aspects, the access stratum configuration corresponds to a radio access stratum configuration of the relay UE and includes an information element indicating at least one of radio access discontinuous reception configuration or an inactivity timer for the remote UE for maintaining the connection with the network entity.

In a thirteenth aspect, alone or in combination with one or more of the first through twelfth aspects, the one or more bearers are handled by a radio access packet data convergence protocol entity or a radio access service data adaptation protocol entity, based at least in part on the radio bearer configuration information element.

In a fourteenth aspect, alone or in combination with one or more of the first through thirteenth aspects, a sidelink radio link control entity of the remote UE is configured to handle a protocol data unit format associated with the radio access packet data convergence protocol entity.

In a fifteenth aspect, alone or in combination with one or more of the first through fourteenth aspects, process 1000 includes receiving (e.g., using reception component 1304 depicted in FIG. 13) configuration information for a sidelink bearer between the remote UE and the relay UE, wherein the configuration information includes a particular radio bearer configuration and a particular access stratum configuration for the sidelink bearer, identifying (e.g., using establishment component 1306, depicted in FIG. 13) the sidelink bearer with the relay UE for the established sidelink unicast link based at least in part on one or more sidelink radio resource control messages, and configuring (e.g., using configuration component 1310, depicted in FIG. 13) the sidelink bearer in accordance with the configuration information.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
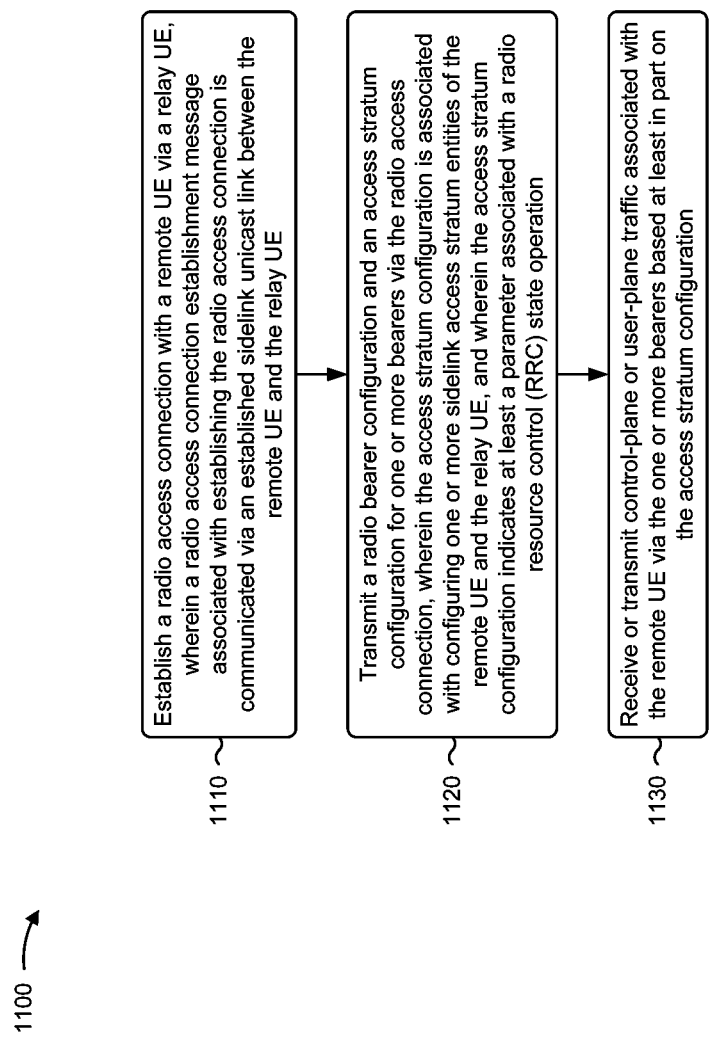

FIG. 11 is a diagram illustrating an example process 1100 performed, for example, by a network entity, in accordance with various aspects of the present disclosure. Example process 1100 is an example where the network entity (e.g., BS 110, the NG-RAN of FIGS. 3 and 4, the AMF of FIGS. 3 and 4, the SMF of FIGS. 3 and 4, or the like) performs operations associated with UE to network relay.

As shown in FIG. 11, in some aspects, process 1100 may include establishing a radio access connection with a remote UE via a relay UE, wherein a radio access connection establishment message associated with establishing the radio access connection is communicated via an established sidelink unicast link between the remote UE and the relay UE (block 1110). For example, the network entity (e.g., using transmission component 1510, depicted in FIG. 15) may establish a radio access connection with a remote UE via a relay UE, wherein a radio access connection establishment message associated with establishing the radio access connection is communicated via an established sidelink unicast link between the remote UE and the relay UE, as described above.

As further shown in FIG. 11, in some aspects, process 1100 may include transmitting a radio bearer configuration and an access stratum configuration for one or more bearers via the radio access connection, wherein the access stratum configuration is associated with configuring one or more sidelink access stratum entities of the remote UE and the relay UE, and wherein the access stratum configuration indicates at least a parameter associated with an RRC state operation (block 1120). For example, the network entity (e.g., using transmission component 1510, depicted in FIG. 15) may transmit a radio bearer configuration and an access stratum configuration for one or more bearers via the radio access connection, wherein the access stratum configuration is associated with configuring one or more sidelink access stratum entities of the remote UE and the relay UE, and wherein the access stratum configuration indicates at least a parameter associated with an RRC state operation (e.g., a discontinuous reception configuration parameter, an inactivity timer parameter, or the like), as described above.

As further shown in FIG. 11, in some aspects, process 1100 may include receiving or transmitting control-plane or user-plane traffic associated with the remote UE via the one or more bearers based at least in part on the access stratum configuration (block 1130). For example, the network entity (e.g., using reception component 1504, depicted in FIG. 15) may receive or transmit control-plane or user-plane traffic associated with the remote UE via the one or more bearers based at least in part on the access stratum configuration, as described above.

Process 1100 may include additional aspects, such as any single aspect or any combination of aspects described below and/or in connection with one or more other processes described elsewhere herein.

In a first aspect, the radio access connection establishment message comprises a radio resource control message, and the radio access connection establishment message is transmitted without encapsulating the radio access connection establishment message in a sidelink signaling container.

In a second aspect, alone or in combination with the first aspect, the access stratum configuration is associated with a radio bearer configuration information element for the one or more bearers, and the one or more bearers comprise at least one of a signaling radio bearer or a data radio bearer.

In a third aspect, alone or in combination with one or more of the first and second aspects, the radio bearer configuration information element indicates at least one of a configuration for a control-plane radio access entity of the remote UE, a configuration for a user-plane radio access entity of the remote UE, or a security configuration for the one or more bearers.

In a fourth aspect, alone or in combination with one or more of the first through third aspects, the radio access connection establishment message is transmitted or received without encapsulation in a sidelink signaling container, wherein the radio access connection establishment message is transmitted or received via a signaling radio bearer that is configured with one or more sidelink logical channels for communication associated with establishing the radio access connection, wherein the signaling radio bearer is different than a signaling radio bearer used to configure the established sidelink unicast link, and wherein the signaling radio bearer is handled by a control-plane radio access packet data convergence protocol entity.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
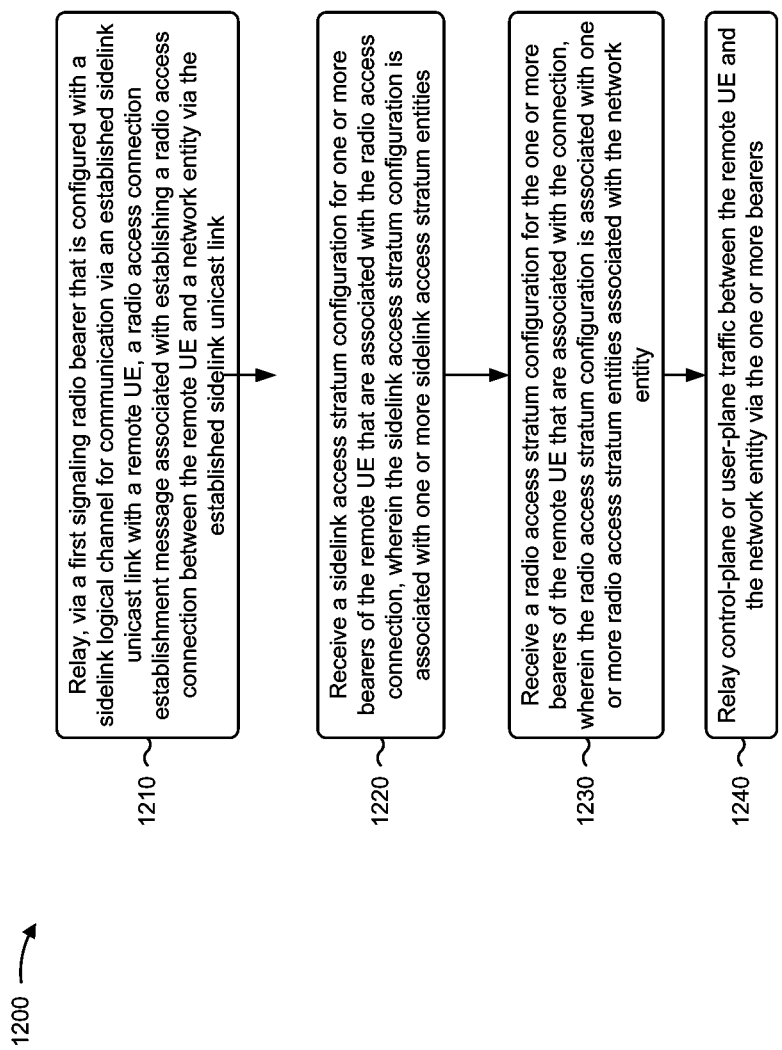

FIG. 12 is a diagram illustrating an example process 1200 performed, for example, by a relay UE, in accordance with various aspects of the present disclosure. Example process 1200 is an example where the relay UE (e.g., UE 120) performs operations associated with UE to network relay.

As shown in FIG. 12, in some aspects, process 1200 may include relaying, via a first signaling radio bearer that is configured with a sidelink logical channel for communication via an established sidelink unicast link with a remote UE, a radio access connection establishment message associated with establishing a radio access connection between the remote UE and a network entity via the established sidelink unicast link (block 1210). For example, the relay UE (e.g., using transmission component 1712 or reception component 1704, depicted in FIG. 17) may relay, via a first signaling radio bearer that is configured with a sidelink logical channel for communication via an established sidelink unicast link with a remote UE, a radio access connection establishment message associated with establishing a radio access connection between the remote UE and a network entity via the established sidelink unicast link, as described above.

As further shown in FIG. 12, in some aspects, process 1200 may include receiving a sidelink access stratum configuration for one or more bearers of the remote UE that are associated with the radio access connection, wherein the sidelink access stratum configuration is associated with one or more sidelink access stratum entities (block 1220). For example, the relay UE (e.g., using reception component 1704, depicted in FIG. 17) may receive a sidelink access stratum configuration for one or more bearers of the remote UE that are associated with the radio access connection, wherein the sidelink access stratum configuration is associated with one or more sidelink access stratum entities, as described above.

As further shown in FIG. 12, in some aspects, process 1200 may include receiving a radio access stratum configuration for the one or more bearers of the remote UE that are associated with the connection, wherein the radio access stratum configuration is associated with one or more radio access stratum entities associated with the network entity (block 1230). For example, the relay UE (e.g., using reception component 1704, depicted in FIG. 17) may receive a radio access stratum configuration for the one or more bearers of the remote UE that are associated with the connection, wherein the radio access stratum configuration is associated with one or more radio access stratum entities associated with the network entity, as described above.

As further shown in FIG. 12, in some aspects, process 1200 may include relaying control-plane or user-plane traffic between the remote UE and the network entity via the one or more bearers (block 1240). For example, the relay UE (e.g., using transmission component 1712, depicted in FIG. 17) may relay control-plane or user-plane traffic between the remote UE and the network entity via the one or more bearers, as described above.

Process 1200 may include additional aspects, such as any single aspect or any combination of aspects described below and/or in connection with one or more other processes described elsewhere herein.

In a first aspect, the sidelink access stratum configuration relates to one or more logical channels associated with relay traffic, and the sidelink access stratum configuration is received from the remote UE via a sidelink radio resource control configuration.

In a second aspect, alone or in combination with the first aspect, the sidelink access stratum configuration and the radio access stratum configuration relate to one or more logical channels, and the radio access stratum configuration is received from the network entity via a radio resource control reconfiguration message that indicates access stratum configuration information for the one or more logical channels.

In a third aspect, alone or in combination with one or more of the first and second aspects, the radio access stratum configuration indicates a configuration for at least one of a radio link control entity, a medium access control entity, a physical layer entity, or an adaptation layer entity.

In a fourth aspect, alone or in combination with one or more of the first through third aspects, the adaptation layer entity is separate from and between the radio link control entity and a packet data convergence entity.

In a fifth aspect, alone or in combination with one or more of the first through fourth aspects, the adaptation layer is part of a packet data convergence entity or the radio link control entity.

In a sixth aspect, alone or in combination with one or more of the first through fifth aspects, the one or more sidelink access stratum entities are associated with relay traffic based at least in part on a configuration of the one or more sidelink access stratum entities, and relaying control-plane or user-plane traffic between the remote UE and the network entity via the one or more bearers further comprises forwarding the control-plane or user-plane traffic to an adaptation layer entity of the relay UE based at least in part on the control-plane or user-plane traffic being associated with the one or more sidelink access stratum entities.

In a seventh aspect, alone or in combination with one or more of the first through sixth aspects, the one or more sidelink access stratum entities are associated with relay traffic based at least in part on a logical channel identifier associated with the one or more sidelink access stratum entities, and an adaptation layer entity of the relay UE forwards the control-plane or user-plane traffic from the one or more sidelink access stratum entities to the one or more radio access stratum entities based at least in part on the logical channel identifier.

In an eighth aspect, alone or in combination with one or more of the first through seventh aspects, process 1200 includes receiving (e.g., using reception component 1704 depicted in FIG. 17) configuration information for a sidelink bearer between the remote UE and the relay UE, wherein the configuration information includes a particular radio bearer configuration and a particular access stratum configuration for the sidelink bearer, identifying (e.g., using establishment component 1706 depicted in FIG. 17) the sidelink bearer with the remote UE for the established sidelink unicast link based at least in part on one or more sidelink radio resource control messages, and configuring (e.g., using configuration component 1710 depicted in FIG. 17) the sidelink bearer in accordance with the configuration information.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
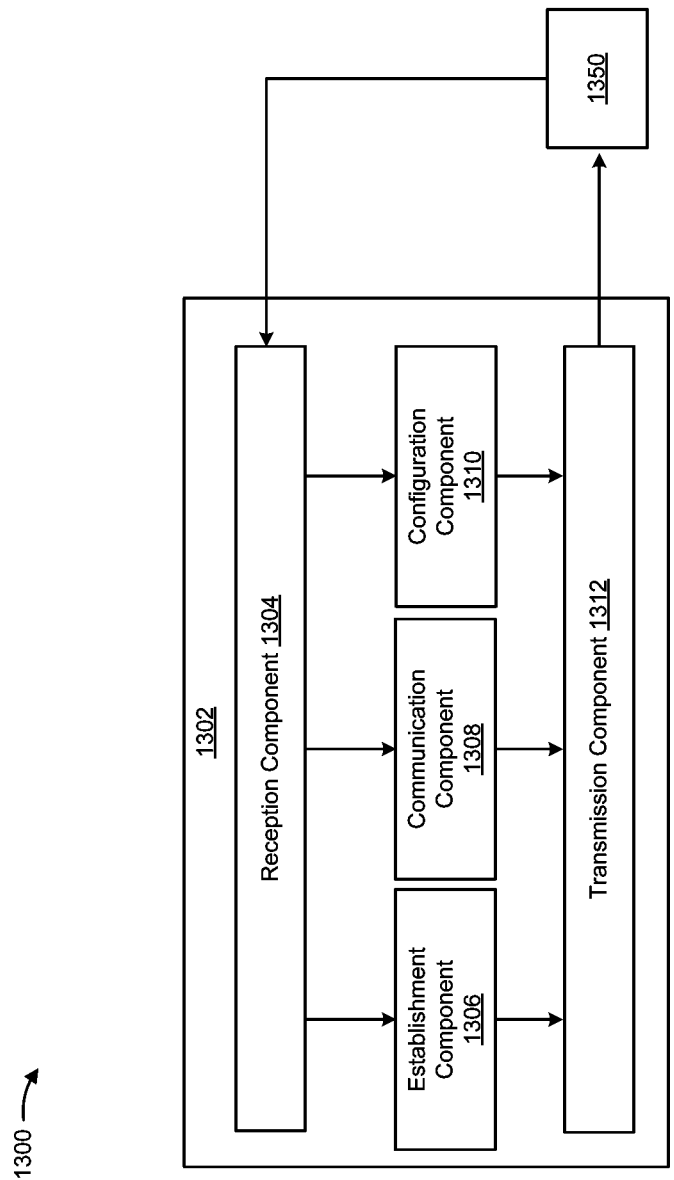
FIGS. 13, 15, and 17 are data flow diagrams illustrating examples of a data flow between different components in example apparatuses, in accordance with various aspects of the present disclosure.

FIG. 13 is a conceptual data flow diagram 1300 illustrating a data flow between different components in an example apparatus 1302. The apparatus 1302 may be a remote UE. In some aspects, the apparatus 1302 includes a reception component 1304, an establishment component 1306, a communication component 1308, a configuration component 1310, and/or a transmission component 1312.

The reception component 1304 may receive control-plane or user-plane traffic via one or more bearers. In some aspects, the reception component 1304 may receive configuration information for a sidelink bearer between the apparatus 1302 and a relay UE. In some aspects, the reception component 1304 may receive an access stratum configuration from a base station 1350. The base station 1350 may be associated with a network entity, as described in more detail in connection with FIGS. 12, 17, and 18. In some aspects, the reception component 1304 may receive a radio bearer configuration for one or more bearers from the base station 1350. The establishment component 1306 may establish a connection (e.g., an RRC connection) with a base station via a relay UE, one or more bearers based at least in part on an access stratum configuration, a unicast link between the apparatus 1302 and a relay UE, one or more sidelink access stratum entities for the one or more bearers using one or more sidelink radio resource control messages based at least in part on an access stratum configuration received from a base station via the connection; and/or the like. The communication component 1308 may communicate a message (e.g., an NR RRC message, a radio access connection establish message and/or the like) via an SRB that is configured, prior to establishment of a unicast link, with one or more logical channels for communication associated with establishing the connection. For example, the SRB may be a first SRB that is configured with a sidelink logical channel for communication via an established sidelink unicast link (e.g., the unicast link). The configuration component 1310 may configure a sidelink bearer in accordance with the configuration information, wherein the sidelink bearer is handled by a sidelink packet data convergence protocol entity or a sidelink service data adaptation protocol entity of the apparatus 1302. The transmission component 1312 may transmit control-plane or user-plane traffic via the one or more bearers or information associated with establishing the one or more bearers, a sidelink bearer, a unicast link, and/or the like (e.g., based at least in part on the access stratum configuration.

The apparatus may include additional components that perform each of the blocks of the algorithm in the aforementioned process 700 of FIG. 7, process 1000 of FIG. 10, and/or the like. Each block in the aforementioned process 700 of FIG. 7, process 1000 of FIG. 10, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of components (e.g., one or more components) shown in FIG. 13 may perform one or more functions described as being performed by another set of components shown in FIG. 13.

Figure 14:
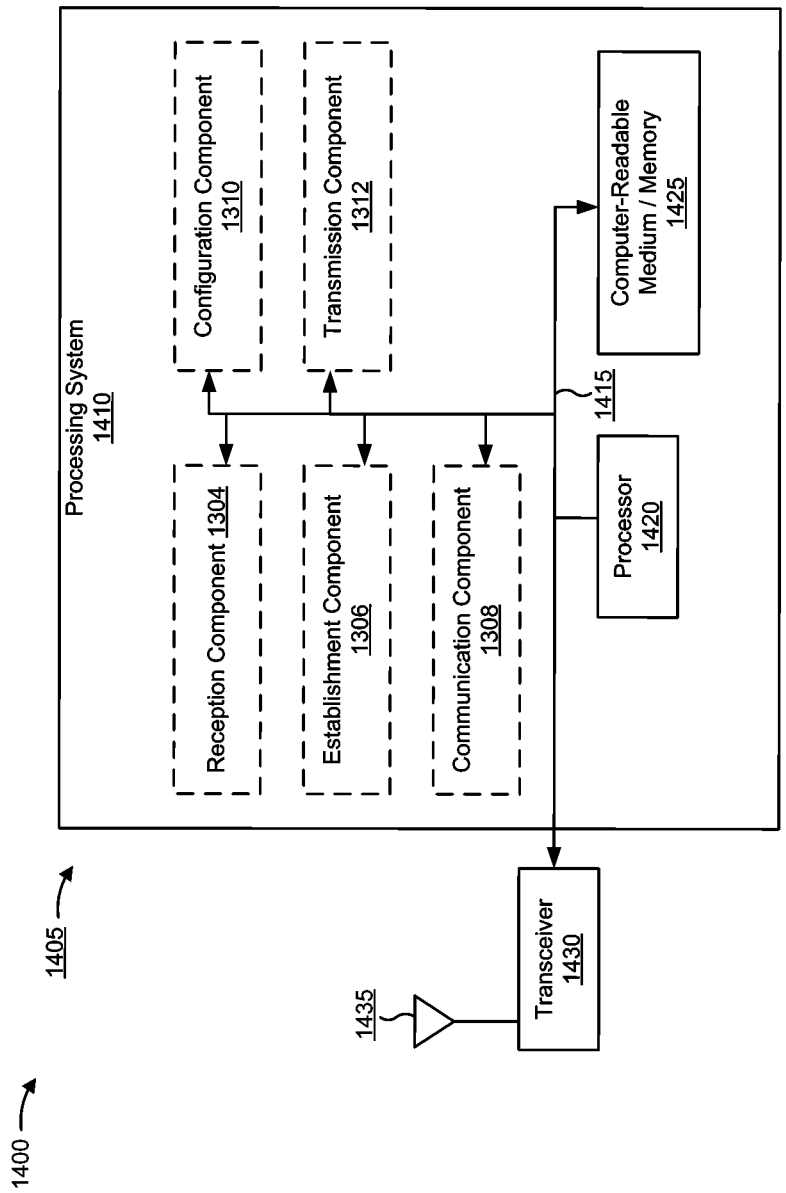
FIGS. 14, 16, and 18 are diagrams illustrating examples of hardware implementations for an apparatus employing a processing system, in accordance with various aspects of the present disclosure.

FIG. 14 is a diagram 1400 illustrating an example of a hardware implementation for an apparatus 1405 employing a processing system 1410. The apparatus 1405 may be a remote UE.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the components 1304, 1306, 1308, 1310, and/or 1312, and the computer-readable medium/memory 1425. The bus 1415 may also link various other circuits such as timing sources, peripherals, voltage regulators, and power management circuits, which are well known in the art, and therefore will not be described any further.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1304. In addition, the transceiver 1430 receives information from the processing system 1410, specifically the transmission component 1312, and based at least in part on the received information, generates a signal to be applied to the one or more antennas 1435.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the components 1304, 1306, 1308, 1310, and/or 1312. The components may be software modules running in the processor 1420, resident/stored in the computer readable medium/memory 1425, one or more hardware modules coupled to the processor 1420, or some combination thereof.

In some aspects, the processing system 1410 may be a component of the UE 120 and may include the memory 282 and/or at least one of the TX MIMO processor 266, the RX processor 258, and/or the controller/processor 280. In some aspects, the apparatus 1405 for wireless communication includes means for establishing, via a sidelink signaling interface, a unicast link between the remote UE and a relay UE; means for establishing a connection with a base station via the relay UE, wherein a message associated with establishing the connection is communicated via the unicast link; means for establishing one or more bearers based at least in part on a radio bearer configuration received from the base station via the connection; means for establishing, with the relay UE, one or more sidelink access stratum entities for the one or more bearers using one or more sidelink radio resource control messages based at least in part on an access stratum configuration received from the base station via the connection; means for receiving or transmitting control-plane or user-plane traffic via the one or more bearers; means for receiving configuration information for a sidelink bearer between the remote UE and the relay UE; means for establishing the sidelink bearer with the relay UE for the unicast link using one or more sidelink radio resource control messages; means for configuring the sidelink bearer in accordance with the configuration information, wherein the sidelink bearer is handled by a sidelink packet data convergence protocol entity or a sidelink service data adaptation protocol entity of the remote UE; means for establishing, with the relay UE, one or more sidelink access stratum entities for the one or more bearers using one or more sidelink radio resource control messages based at least in part on an access stratum configuration received from the base station via the connection; means for establishing the sidelink bearer with the relay UE for the unicast link using one or more sidelink radio resource control messages; means for communicating a radio access connection establishment message with a network entity (e.g., base station 110, base station 1350) via a relay UE, over a first signaling radio bearer that is configured with a sidelink logical channel for communication via an established sidelink unicast link with the relay UE; means for receiving a radio bearer configuration for one or more bearers from the network entity via a radio access connection that is established based at least in part on the radio access connection establishment message; means for receiving an access stratum configuration via the radio access connection, wherein the access stratum configuration is associated with configuring one or more sidelink access stratum entities for the one or more bearers; means for receiving or transmitting control-plane or user-plane traffic via the one or more bearers based at least in part on the access stratum configuration; and/or the like. The aforementioned means may be one or more of the aforementioned components of the apparatus 1302 and/or the processing system 1410 of the apparatus 1405 configured to perform the functions recited by the aforementioned means. As described elsewhere herein, the processing system 1410 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 14 is provided as an example. Other examples may differ from what is described in connection with FIG. 14.

Figure 15:
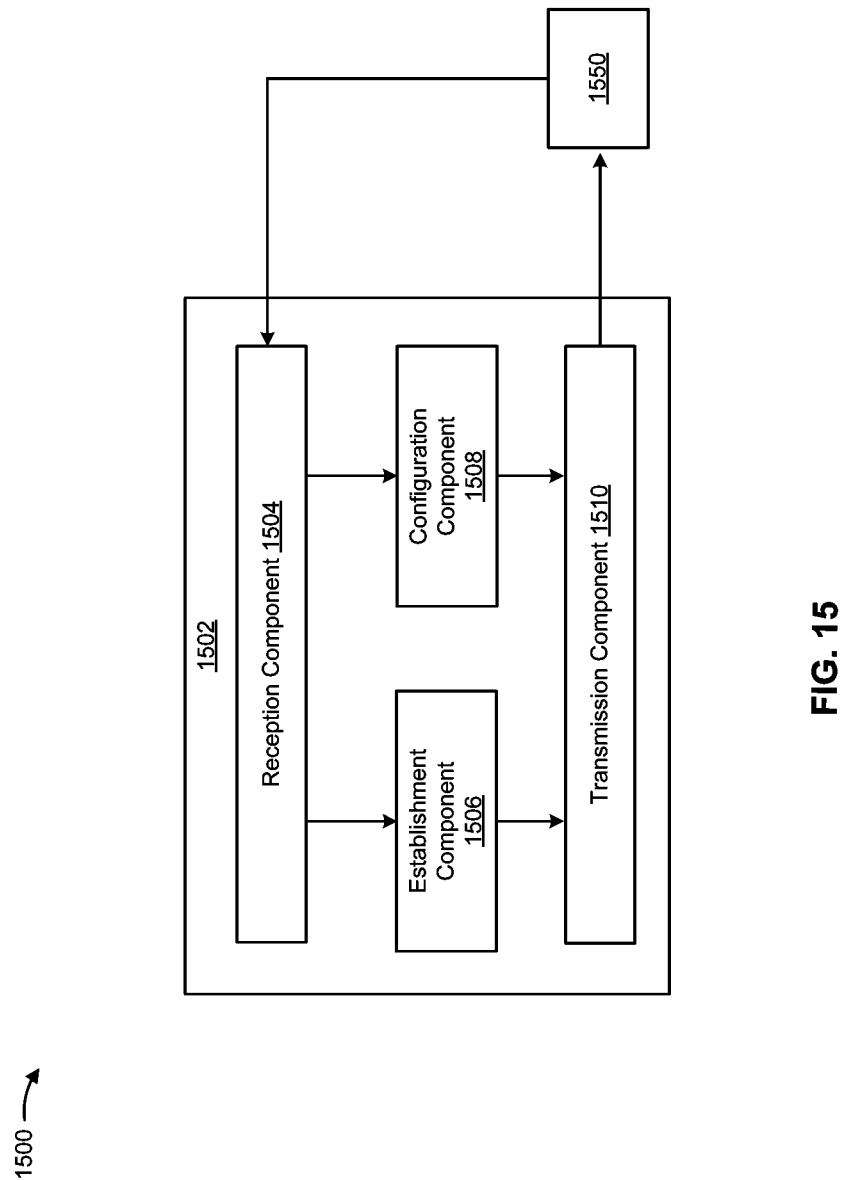

FIG. 15 is a conceptual data flow diagram 1500 illustrating a data flow between different components in an example apparatus 1502. The apparatus 1502 may be a network entity, such as a base station, an NG-RAN, a core network device, an AMF, an SMF, or the like. In some aspects, a base station may facilitate communications of the apparatus 1502. In some aspects, the apparatus 1502 includes a reception component 1504, an establishment component 1506, a configuration component 1508, and/or a transmission component 1510.

The reception component 1504 may receive control-plane or user-plane traffic associated with a remote UE via one or more bearers (e.g., between the remote UE and a relay UE). The establishment component 1506 may establish a connection (e.g., a radio access connection) with a remote UE 1550 via a relay UE, wherein a message (e.g., a radio access connection establishment message) associated with establishing the connection is communicated via a unicast link (e.g., an established sidelink unicast link) between the remote UE and the relay UE without encapsulating the message in a sidelink signaling container. The configuration component 1508 may configure a signaling radio bearer used for the message prior to establishment of the unicast link. The transmission component 1510 may transmit a radio bearer configuration and an access stratum configuration for one or more bearers via the connection, control-plane or user-plane traffic associated with the remote UE via the one or more bearers, a radio bearer configuration information element for the one or more bearers, configuration information for a sidelink bearer between the remote UE and the relay UE, a radio access stratum configuration that is provided via a radio resource control reconfiguration message, and/or the like.

The apparatus may include additional components that perform each of the blocks of the algorithm in the aforementioned process 800 of FIG. 8, process 1100 of FIG. 11, and/or the like. Each block in the aforementioned process 800 of FIG. 8, process 1100 of FIG. 11, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of components (e.g., one or more components) shown in FIG. 15 may perform one or more functions described as being performed by another set of components shown in FIG. 15.

Figure 16:
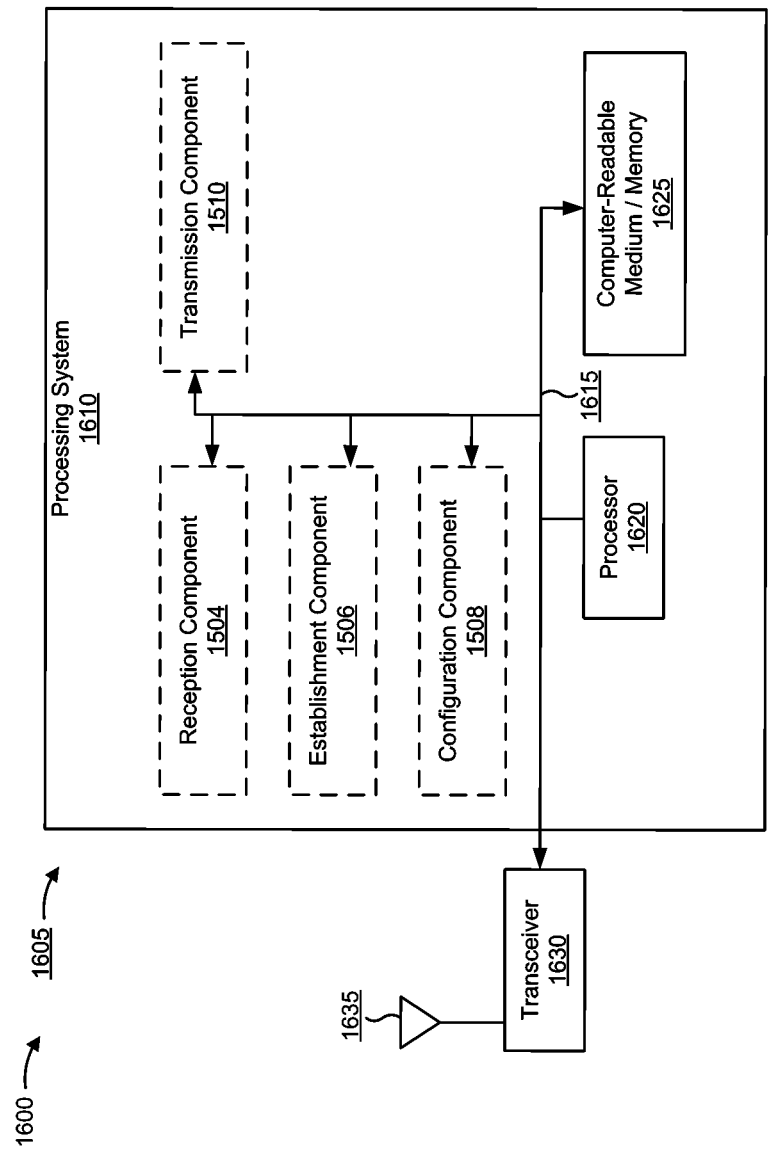

FIG. 16 is a diagram 1600 illustrating an example of a hardware implementation for an apparatus 1605 employing a processing system 1610. The apparatus 1605 may be a network entity.

The processing system 1610 may be implemented with a bus architecture, represented generally by the bus 1615. The bus 1615 may include any number of interconnecting buses and bridges depending on the specific application of the processing system 1610 and the overall design constraints. The bus 1615 links together various circuits including one or more processors and/or hardware components, represented by the processor 1620, the components 1504, 1506, 1508, and/or 1510, and the computer-readable medium/memory 1625. The bus 1615 may also link various other circuits such as timing sources, peripherals, voltage regulators, and power management circuits, which are well known in the art, and therefore will not be described any further.

The processing system 1610 may be coupled to a transceiver 1630. The transceiver 1630 is coupled to one or more antennas 1635. The transceiver 1630 provides a means for communicating with various other apparatuses over a transmission medium. The transceiver 1630 receives a signal from the one or more antennas 1635, extracts information from the received signal, and provides the extracted information to the processing system 1610, specifically the reception component 1504. In addition, the transceiver 1630 receives information from the processing system 1610, specifically the transmission component 1510, and based at least in part on the received information, generates a signal to be applied to the one or more antennas 1635.

The processing system 1610 includes a processor 1620 coupled to a computer-readable medium/memory 1625. The processor 1620 is responsible for general processing, including the execution of software stored on the computer-readable medium/memory 1625. The software, when executed by the processor 1620, causes the processing system 1610 to perform the various functions described herein for any particular apparatus. The computer-readable medium/memory 1625 may also be used for storing data that is manipulated by the processor 1620 when executing software. The processing system further includes at least one of the components 1504, 1506, 1508, and/or 1510. The components may be software modules running in the processor 1620, resident/stored in the computer readable medium/memory 1625, one or more hardware modules coupled to the processor 1620, or some combination thereof.

In some aspects, the processing system 1610 may be a component of the base station 110 and may include the memory 242 and/or at least one of the TX MIMO processor 230, the RX processor 238, and/or the controller/processor 240. In some aspects, the apparatus 1605 for wireless communication includes means for establishing a connection with a remote UE via a relay UE, wherein a message associated with establishing the connection is communicated via a unicast link between the remote UE and the relay UE; means for transmitting a radio bearer configuration and an access stratum configuration for one or more bearers via the connection, wherein the access stratum configuration is for one or more sidelink access stratum entities of the remote UE and the relay UE, and wherein the access stratum configuration indicates a parameter associated with a radio resource control (RRC) state operation; means for receiving or transmitting control-plane or user-plane traffic associated with the remote UE via the one or more bearers; means for configuring a signaling radio bearer used for the message prior to establishment of the unicast link, wherein the signaling radio bearer is different than a signaling radio bearer used to configure the unicast link; means for transmitting configuration information for a sidelink bearer between the remote UE and the relay UE, wherein the configuration information for the sidelink bearer is associated with configuring a sidelink packet data convergence protocol entity or a sidelink service data adaptation protocol entity of the remote UE to handle the sidelink bearer; means for transmitting configuration information for a sidelink bearer between the remote UE and the relay UE, wherein the configuration for the sidelink bearer is associated with configuring a sidelink packet data convergence protocol entity or a sidelink service data adaptation protocol entity of the remote UE to handle the sidelink bearer; means for transmitting, to the relay UE, a radio access stratum configuration that is provided via a radio resource control reconfiguration message, wherein the radio resource control reconfiguration message includes an adaptation layer entity configuration; means for establishing a radio access connection with a remote UE via a relay UE, wherein a radio access connection establishment message associated with establishing the radio access connection is communicated via an established sidelink unicast link between the remote UE and the relay UE; means for transmitting a radio bearer configuration and an access stratum configuration for one or more bearers via the radio access connection, wherein the access stratum configuration is associated with configuring one or more sidelink access stratum entities of the remote UE and the relay UE, and wherein the access stratum configuration indicates at least a parameter associated with an RRC state operation; means for receiving or transmitting control-plane or user-plane traffic associated with the remote UE via the one or more bearers based at least in part on the access stratum configuration; and/or the like. The aforementioned means may be one or more of the aforementioned components of the apparatus 1502 and/or the processing system 1610 of the apparatus 1605 configured to perform the functions recited by the aforementioned means. As described elsewhere herein, the processing system 1610 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 16 is provided as an example. Other examples may differ from what is described in connection with FIG. 16.

Figure 17:
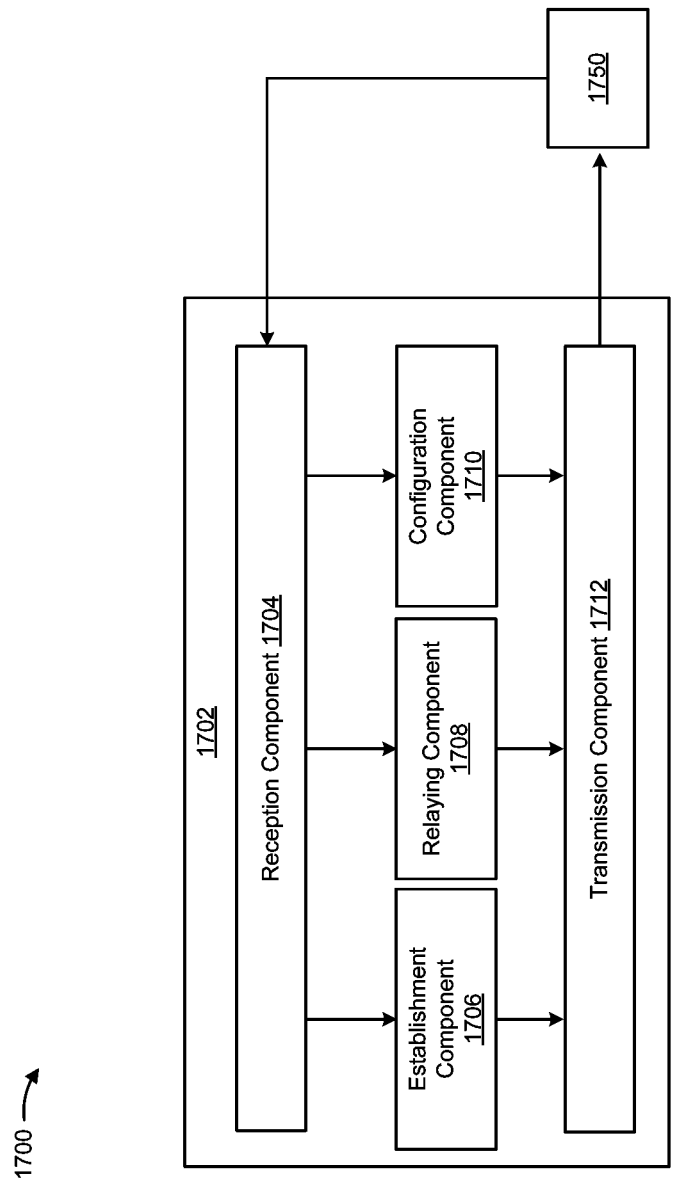

FIG. 17 is a conceptual data flow diagram 1700 illustrating a data flow between different components in an example apparatus 1702. The apparatus 1702 may be a relay UE. In some aspects, the apparatus 1702 includes a reception component 1704, an establishment component 1706, a relaying component 1708, a configuration component 1710, and/or a transmission component 1712.

The reception component 1704 may receive configuration information for a sidelink bearer between a remote UE and the apparatus 1702. In some aspects, the reception component 1704 may receive various communications (e.g., messages, access stratum configurations, and/or the like) that are to be relayed between a base station 1750 and the remote UE by the relaying component 1708. The establishment component 1706 may establish, via a sidelink signaling interface, a unicast link between the apparatus 1702 and a remote UE. In some aspects, the establishment component 1706 may establish one or more bearers with the remote UE based at least in part on an access stratum configuration relayed to the remote UE via the apparatus 1702 or one or more radio access stratum entities with the base station, for the one or more bearers of the remote UE that are associated with the connection, based at least in part on a radio access stratum configuration received by the apparatus 1702. The relaying component 1708 may relay a message associated with establishing a connection between the remote UE and a base station via the unicast link, control-plane or user-plane traffic between the remote UE and the base station via the one or more sidelink access stratum entities and the one or more radio access stratum entities or via the one or more bearers, and/or the like. In some aspects, the relaying component 1708 may relay, via a first signaling radio bearer that is configured with a sidelink logical channel for communication via an established sidelink unicast link with a remote UE, a radio access connection establishment message associated with establishing a radio access connection between the remote UE and a network entity via the established sidelink unicast link. The reception component 1704 may receive a sidelink access stratum configuration and/or a radio access stratum configuration. The configuration component 1710 may configure a sidelink bearer in accordance with configuration information received by the reception component 1704. The transmission component 1712 may transmit various information, such as information to be relayed between the remote UE and the base station by the relaying component 1708.

The apparatus may include additional components that perform each of the blocks of the algorithm in the aforementioned process 900 of FIG. 9, process 1200 of FIG. 12, and/or the like. Each block in the aforementioned process 900 of FIG. 9, process 1200 of FIG. 12, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of components (e.g., one or more components) shown in FIG. 17 may perform one or more functions described as being performed by another set of components shown in FIG. 17.

Figure 18:
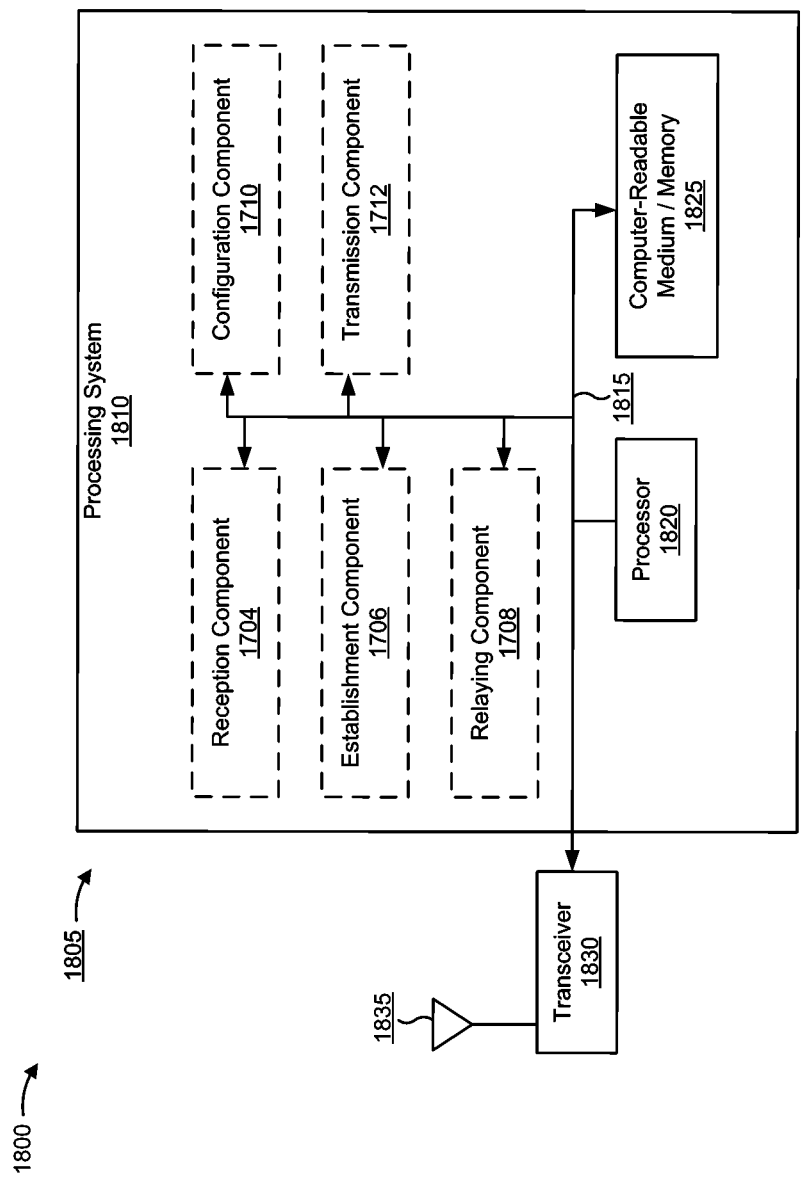

FIG. 18 is a diagram 1800 illustrating an example of a hardware implementation for an apparatus 1805 employing a processing system 1810. The apparatus 1805 may be a relay UE.

The processing system 1810 may be implemented with a bus architecture, represented generally by the bus 1815. The bus 1815 may include any number of interconnecting buses and bridges depending on the specific application of the processing system 1810 and the overall design constraints. The bus 1815 links together various circuits including one or more processors and/or hardware components, represented by the processor 1820, the components 1704, 1706, 1708, 1710, and/or 1712, and the computer-readable medium/memory 1825. The bus 1815 may also link various other circuits such as timing sources, peripherals, voltage regulators, and power management circuits, which are well known in the art, and therefore will not be described any further.

The processing system 1810 may be coupled to a transceiver 1830. The transceiver 1830 is coupled to one or more antennas 1835. The transceiver 1830 provides a means for communicating with various other apparatuses over a transmission medium. The transceiver 1830 receives a signal from the one or more antennas 1835, extracts information from the received signal, and provides the extracted information to the processing system 1810, specifically the reception component 1704. In addition, the transceiver 1830 receives information from the processing system 1810, specifically the transmission component 1712, and based at least in part on the received information, generates a signal to be applied to the one or more antennas 1835.

The processing system 1810 includes a processor 1820 coupled to a computer-readable medium/memory 1825. The processor 1820 is responsible for general processing, including the execution of software stored on the computer-readable medium/memory 1825. The software, when executed by the processor 1820, causes the processing system 1810 to perform the various functions described herein for any particular apparatus. The computer-readable medium/memory 1825 may also be used for storing data that is manipulated by the processor 1820 when executing software. The processing system further includes at least one of the components 1704, 1706, 1708, 1710, and/or 1712. The components may be software modules running in the processor 1820, resident/stored in the computer readable medium/memory 1825, one or more hardware modules coupled to the processor 1820, or some combination thereof.

In some aspects, the processing system 1810 may be a component of the UE 120 and may include the memory 282 and/or at least one of the TX MIMO processor 266, the RX processor 258, and/or the controller/processor 280. In some aspects, the apparatus 1805 for wireless communication includes means for establishing, via a sidelink signaling interface, a unicast link between the relay UE and a remote UE; means for relaying a message associated with establishing a connection between the remote UE and a base station via the unicast link; means for establishing one or more sidelink access stratum entities with the remote UE, for one or more bearers of the remote UE that are associated with the connection, based at least in part on a sidelink access stratum configuration; means for relaying control-plane or user-plane traffic between the remote UE and the base station via the one or more sidelink access stratum entities; means for receiving configuration information for a sidelink bearer between the remote UE and the relay UE; means for configuring the sidelink bearer in accordance with the configuration information, wherein the sidelink bearer is handled by a sidelink packet data convergence protocol entity or a sidelink service data adaptation protocol entity of the relay UE; means for receiving configuration information for a sidelink bearer between the remote UE and the relay UE; means for configuring the sidelink bearer in accordance with the configuration information, wherein the sidelink bearer is handled by a sidelink packet data convergence protocol entity or a sidelink service data adaptation protocol entity of the relay UE; means for establishing the sidelink bearer with the remote UE for the unicast link using one or more sidelink radio resource control messages; means for establishing one or more radio access stratum entities with the base station, for the one or more bearers of the remote UE that are associated with the connection, based at least in part on a radio access stratum configuration received by the relay UE; means for relaying, via a first signaling radio bearer that is configured with a sidelink logical channel for communication via an established sidelink unicast link with a remote UE, a radio access connection establishment message associated with establishing a radio access connection between the remote UE and a network entity via the established sidelink unicast link; means for receiving a sidelink access stratum configuration for one or more bearers of the remote UE that are associated with the radio access connection, wherein the sidelink access stratum configuration is associated with one or more sidelink access stratum entities; means for receiving a radio access stratum configuration for the one or more bearers of the remote UE that are associated with the connection, wherein the radio access stratum configuration is associated with one or more radio access stratum entities associated with the network entity; means for relaying control-plane or user-plane traffic between the remote UE and the network entity via the one or more bearers; and/or the like. The aforementioned means may be one or more of the aforementioned components of the apparatus 1702 and/or the processing system 1810 of the apparatus 1805 configured to perform the functions recited by the aforementioned means. As described elsewhere herein, the processing system 1810 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 18 is provided as an example. Other examples may differ from what is described in connection with FIG. 18.

The following provides an overview of some aspects of the present disclosure:

Aspect 1: A method of wireless communication performed by a remote UE, comprising: communicating a radio access connection establishment message with a network entity via a relay UE, over a first signaling radio bearer that is configured with a sidelink logical channel for communication via an established sidelink unicast link with the relay UE; receiving a radio bearer configuration for one or more bearers from the network entity via a radio access connection that is established based at least in part on the radio access connection establishment message; receiving an access stratum configuration via the radio access connection, wherein the access stratum configuration is associated with configuring one or more sidelink access stratum entities for the one or more bearers; and receiving or transmitting control-plane or user-plane traffic via the one or more bearers based at least in part on the access stratum configuration.

Aspect 2: The method of aspect 1, wherein the first signaling radio bearer is a signaling radio access bearer 0 (SRB0) associated with radio resource control messaging and is handled by a radio access entity of the remote UE.

Aspect 3: The method of aspect 2, wherein the radio access entity comprises a control-plane radio access packet data convergence protocol entity.

Aspect 4: The method of aspect 2, wherein the remote UE is associated with a sidelink signaling entity that handles a sidelink signaling interface of the remote UE, and wherein the established sidelink unicast link is set up by the sidelink signaling entity.

Aspect 5: The method of any of aspects 1-4, wherein the first signaling radio bearer is different than a signaling radio bearer used to set up the established sidelink unicast link.

Aspect 6: The method of any of aspects 1-5, wherein a configuration for the first signaling radio bearer and the sidelink logical channel is pre-configured or defined.

Aspect 7: The method of any of aspects 1-6, wherein the radio access connection establishment message is communicated without encapsulating the radio access connection establishment message in a sidelink signaling container.

Aspect 8: The method of any of aspects 1-7, wherein the radio access connection establishment message comprises a radio resource control message associated with transitioning from a radio resource control idle state operation or a radio resource control inactive state operation to a radio resource control connected state operation.

Aspect 9: The method of any of aspects 1-8, wherein the control-plane or user-plane traffic bypasses a sidelink protocol data convergence protocol entity or a service data adaptation protocol entity of the remote UE.

Aspect 10: The method of any of aspects 1-9, wherein the access stratum configuration is associated with a radio bearer configuration information element for the one or more bearers, and wherein the one or more bearers comprise at least one of a signaling radio bearer or a data radio bearer.

Aspect 11: The method of aspect 10, wherein the radio bearer configuration information element indicates at least one of: a configuration for a user-plane radio access entity of the remote UE, a configuration for a control-plane radio access entity of the remote UE, or a security configuration for the one or more bearers.

Aspect 12: The method of aspect 10, wherein the access stratum configuration includes an information element indicating at least one of a sidelink radio link control entity, a medium access control entity, or a physical layer entity configuration for the one or more bearers.

Aspect 13: The method of aspect 10, wherein the access stratum configuration corresponds to a radio access stratum configuration of the relay UE and includes an information element indicating at least one of radio access discontinuous reception configuration or an inactivity timer for the remote UE for maintaining the connection with the network entity.

Aspect 14: The method of aspect 10, wherein the one or more bearers are handled by a radio access packet data convergence protocol entity or a radio access service data adaptation protocol entity, based at least in part on the radio bearer configuration information element.

Aspect 15: The method of aspect 14, wherein a sidelink radio link control entity of the remote UE is configured to handle a protocol data unit format associated with the radio access packet data convergence protocol entity.

Aspect 16: The method of any of aspects 1-15, further comprising: receiving configuration information for a sidelink bearer between the remote UE and the relay UE, wherein the configuration information includes a particular radio bearer configuration and a particular access stratum configuration for the sidelink bearer; identifying the sidelink bearer with the relay UE for the established sidelink unicast link based at least in part on one or more sidelink radio resource control messages; and configuring the sidelink bearer in accordance with the configuration information.

Aspect 17: A method of wireless communication performed by a network entity, comprising: establishing a radio access connection with a remote UE via a relay UE, wherein a radio access connection establishment message associated with establishing the radio access connection is communicated via an established sidelink unicast link between the remote UE and the relay UE; transmitting a radio bearer configuration and an access stratum configuration for one or more bearers via the radio access connection, wherein the access stratum configuration is associated with configuring one or more sidelink access stratum entities of the remote UE and the relay UE, and wherein the access stratum configuration indicates at least a parameter associated with a radio resource control (RRC) state operation; and receiving or transmitting control-plane or user-plane traffic associated with the remote UE via the one or more bearers based at least in part on the access stratum configuration.

Aspect 18: The method of aspect 17, wherein the radio access connection establishment message comprises a radio resource control message, and wherein the radio access connection establishment message is transmitted without encapsulating the radio access connection establishment message in a sidelink signaling container.

Aspect 19: The method of any of aspects 17-18, wherein the access stratum configuration is associated with a radio bearer configuration information element for the one or more bearers, and wherein the one or more bearers comprise at least one of a signaling radio bearer or a data radio bearer.

Aspect 20: The method of aspect 19, wherein the radio bearer configuration information element indicates at least one of: a configuration for a control-plane radio access entity of the remote UE, a configuration for a user-plane radio access entity of the remote UE, or a security configuration for the one or more bearers.

Aspect 21: The method of any of aspects 17-20, wherein the radio access connection establishment message is transmitted or received without encapsulation in a sidelink signaling container, wherein the radio access connection establishment message is transmitted or received via a signaling radio bearer that is configured with one or more sidelink logical channels for communication associated with establishing the radio access connection, wherein the signaling radio bearer is different than a signaling radio bearer used to configure the established sidelink unicast link, and wherein the signaling radio bearer is handled by a control-plane radio access packet data convergence protocol entity.

Aspect 22: A method of wireless communication performed by a relay UE, comprising: relaying, via a first signaling radio bearer that is configured with a sidelink logical channel for communication via an established sidelink unicast link with a remote UE, a radio access connection establishment message associated with establishing a radio access connection between the remote UE and a network entity via the established sidelink unicast link; receiving a sidelink access stratum configuration for one or more bearers of the remote UE that are associated with the radio access connection, wherein the sidelink access stratum configuration is associated with one or more sidelink access stratum entities; receiving a radio access stratum configuration for the one or more bearers of the remote UE that are associated with the connection, wherein the radio access stratum configuration is associated with one or more radio access stratum entities associated with the network entity; and relaying control-plane or user-plane traffic between the remote UE and the network entity via the one or more bearers.

Aspect 23: The method of aspect 22, wherein the sidelink access stratum configuration relates to one or more logical channels associated with relay traffic, and wherein the sidelink access stratum configuration is received from the remote UE via a sidelink radio resource control configuration.

Aspect 24: The method of any of aspects 22-23, wherein the sidelink access stratum configuration and the radio access stratum configuration relate to one or more logical channels, and wherein the radio access stratum configuration is received from the network entity via a radio resource control reconfiguration message that indicates access stratum configuration information for the one or more logical channels.

Aspect 25: The method of aspect 24, wherein the radio access stratum configuration indicates a configuration for at least one of a radio link control entity, a medium access control entity, a physical layer entity, or an adaptation layer entity.

Aspect 26: The method of aspect 25, wherein the adaptation layer entity is separate from and between the radio link control entity and a packet data convergence entity.

Aspect 27: The method of aspect 25, wherein the adaptation layer is part of a packet data convergence entity or the radio link control entity.

Aspect 28: The method of any of aspects 22-27, wherein the one or more sidelink access stratum entities are associated with relay traffic based at least in part on a configuration of the one or more sidelink access stratum entities, and wherein relaying control-plane or user-plane traffic between the remote UE and the network entity via the one or more bearers further comprises forwarding the control-plane or user-plane traffic to an adaptation layer entity of the relay UE based at least in part on the control-plane or user-plane traffic being associated with the one or more sidelink access stratum entities.

Aspect 29: The method of any of aspects 22-28, wherein the one or more sidelink access stratum entities are associated with relay traffic based at least in part on a logical channel identifier associated with the one or more sidelink access stratum entities, and wherein an adaptation layer entity of the relay UE forwards the control-plane or user-plane traffic from the one or more sidelink access stratum entities to the one or more radio access stratum entities based at least in part on the logical channel identifier.

Aspect 30: The method of any of aspects 22-29, further comprising: receiving configuration information for a sidelink bearer between the remote UE and the relay UE, wherein the configuration information includes a particular radio bearer configuration and a particular access stratum configuration for the sidelink bearer; identifying the sidelink bearer with the remote UE for the established sidelink unicast link based at least in part on one or more sidelink radio resource control messages; and configuring the sidelink bearer in accordance with the configuration information.

Aspect 31: A method of wireless communication performed by a remote UE, comprising: establishing, via a sidelink signaling interface, a unicast link between the remote UE and a relay UE; establishing a connection with a base station via the relay UE, wherein a message associated with establishing the connection is communicated via the unicast link; establishing one or more bearers based at least in part on a radio bearer configuration received from the base station via the connection; establishing, with the relay UE, one or more sidelink access stratum entities for the one or more bearers using one or more sidelink radio resource control messages based at least in part on an access stratum configuration received from the base station via the connection; and receiving or transmitting control-plane or user-plane traffic via the one or more bearers.

Aspect 32: The method of aspect 31, further comprising: communicating the message via a signaling radio bearer that is configured with one or more sidelink logical channels for communication associated with establishing the connection, wherein the signaling radio bearer is different than a signaling radio bearer used to set up the unicast link.

Aspect 33: The method of aspect 32, wherein the signaling radio bearer is handled by a radio access entity of the remote UE.

Aspect 34: The method of aspect 33, wherein the radio access entity comprises a control-plane radio access packet data convergence protocol entity.

Aspect 35: The method of aspect 33, wherein the remote UE is associated with a sidelink signaling entity that handles the sidelink signaling interface, and wherein the unicast link is set up by the sidelink signaling entity.

Aspect 36: The method of aspect 32, wherein the message is communicated on a logical channel of the one or more sidelink logical channels, and wherein the message is communicated without encapsulating the message in a sidelink signaling container.

Aspect 37: The method of any of aspects 31-36, wherein the message comprises a radio resource control message associated with transitioning from radio resource control idle state or radio resource control inactive state operation to radio resource control connected state operation.

Aspect 38: The method of any of aspects 31-37, wherein the access stratum configuration is associated with a radio bearer configuration information element for the one or more bearers, and wherein the one or more bearers comprise at least one of a signaling radio bearer or a data radio bearer.

Aspect 39: The method of aspect 38, wherein the radio bearer configuration information element indicates at least one of: a configuration for a user-plane radio access entity of the remote UE, a configuration for a control-plane radio access entity of the remote UE, or a security configuration for the one or more bearers.

Aspect 40: The method of aspect 38, wherein the access stratum configuration includes an information element indicating a sidelink radio link control entity, a medium access control entity, and a physical layer entity configuration for the one or more bearers.

Aspect 41: The method of aspect 38, wherein the one or more bearers are handled by a radio access packet data convergence protocol entity or a radio access service data adaptation protocol entity, based at least in part on the radio bearer configuration information element.

Aspect 42: The method of aspect 41, wherein a sidelink radio link control entity of the remote UE is configured to handle a protocol data unit format associated with the radio access packet data convergence protocol entity.

Aspect 43: The method of any of aspects 31-42, further comprising: receiving configuration information for a sidelink bearer between the remote UE and the relay UE; establishing the sidelink bearer with the relay UE for the unicast link using one or more sidelink radio resource control messages; and configuring the sidelink bearer in accordance with the configuration information, wherein the sidelink bearer is handled by a sidelink packet data convergence protocol entity or a sidelink service data adaptation protocol entity of the remote UE.

Aspect 44: The method of any of aspects 31-43, wherein the access stratum configuration is received with the message.

Aspect 45: The method of any of aspects 31-44, wherein the message is transmitted or received via the sidelink signaling interface.

Aspect 46: The method of aspect 45, wherein the message is encapsulated in a sidelink signaling container.

Aspect 47: The method of any of aspects 31-46, wherein establishing the connection with the base station is based at least in part on a parameter indicating a discontinuous reception configuration or an inactivity timer for the remote UE and wherein the method further comprises maintaining the connection with the base station based at least in part on the parameter.

Aspect 48: The method of any of aspects 31-47, wherein the control-plane or user-plane traffic bypasses a sidelink protocol data convergence protocol entity or a service data adaptation protocol entity of the remote UE.

Aspect 49: A method of wireless communication performed by a base station, comprising: establishing a connection with a remote UE via a relay UE, wherein a message associated with establishing the connection is communicated via a unicast link between the remote UE and the relay UE; transmitting a radio bearer configuration and an access stratum configuration for one or more bearers via the connection, wherein the access stratum configuration is for one or more sidelink access stratum entities of the remote UE and the relay UE, and wherein the access stratum configuration indicates a parameter associated with a radio resource control (RRC) state operation; and receiving or transmitting control-plane or user-plane traffic associated with the remote UE via the one or more bearers.

Aspect 50: The method of aspect 49, further comprising: configuring a signaling radio bearer used for the message prior to establishment of the unicast link, wherein the signaling radio bearer is different than a signaling radio bearer used to configure the unicast link.

Aspect 51: The method of any of aspects 49-50, wherein the message comprises a radio resource control message, and wherein the message is transmitted without encapsulating the message in a sidelink signaling container.

Aspect 52: The method of aspect 51, wherein the access stratum configuration is transmitted with the radio resource control message.

Aspect 53: The method of any of aspects 49-52, wherein the access stratum configuration includes an information element indicating a sidelink radio link control entity, a sidelink medium access control entity, and a sidelink physical layer entity configuration for the one or more bearers.

Aspect 54: The method of any of aspects 49-53, further comprising: transmitting configuration information for a sidelink bearer between the remote UE and the relay UE, wherein the configuration information for the sidelink bearer is associated with configuring a sidelink packet data convergence protocol entity or a sidelink service data adaptation protocol entity of the remote UE to handle the sidelink bearer.

Aspect 55: The method of any of aspects 49-54, wherein the access stratum configuration is associated with a radio bearer configuration information element for the one or more bearers, and wherein the one or more bearers comprise at least one of a signaling radio bearer or a data radio bearer.

Aspect 56: The method of aspect 55, wherein the radio bearer configuration information element indicates at least one of: a configuration for a control-plane radio access entity of the remote UE, a configuration for a user-plane radio access entity of the remote UE, or a security configuration for the one or more bearers.

Aspect 57: The method of aspect 55, wherein the one or more bearers are handled by a radio access packet data convergence protocol entity or a radio access service data adaptation protocol entity.

Aspect 58: The method of aspect 57, wherein a sidelink radio link control entity of the remote UE is configured to handle a protocol data unit format associated with the radio access packet data convergence protocol entity.

Aspect 59: The method of any of aspects 49-58, further comprising: transmitting, to the relay UE, a radio access stratum configuration that is provided via a radio resource control reconfiguration message.

Aspect 60: The method of aspect 59, wherein the radio access stratum configuration indicates a configuration for at least one of a radio link control entity, a medium access control entity, a physical layer entity, or an adaptation layer entity.

Aspect 61: The method of aspect 60, wherein the adaptation layer entity is separate from and between the radio link control entity and a packet data convergence entity.

Aspect 62: The method of aspect 60, wherein the adaptation layer is part of a packet data convergence entity or the radio link control entity.

Aspect 63: The method of aspect 59, further comprising: transmitting configuration information for a sidelink bearer between the remote UE and the relay UE, wherein the configuration for the sidelink bearer is associated with configuring a sidelink packet data convergence protocol entity or a sidelink service data adaptation protocol entity of the remote UE to handle the sidelink bearer.

Aspect 64: The method of aspect 59, wherein the message is encapsulated in a sidelink signaling container.

Aspect 65: The method of aspect 59, wherein the parameter associated with the RRC state operation indicates a discontinuous reception configuration or an inactivity timer for the remote UE.

Aspect 66: The method of aspect 59, wherein the message is transmitted or received without encapsulation in a sidelink signaling container, wherein the message is transmitted or received via a signaling radio bearer that is configured with one or more sidelink logical channels for communication associated with establishing the connection, wherein the signaling radio bearer is different than a signaling radio bearer used to configure the unicast link, and wherein the signaling radio bearer is handled by a control-plane radio access packet data convergence protocol entity.

Aspect 67: A method of wireless communication performed by a relay UE, comprising: establishing, via a sidelink signaling interface, a unicast link between the relay UE and a remote UE; relaying a message associated with establishing a connection between the remote UE and a base station via the unicast link; establishing one or more sidelink access stratum entities with the remote UE, for one or more bearers of the remote UE that are associated with the connection, based at least in part on a sidelink access stratum configuration; establishing one or more radio access stratum entities with the base station, for the one or more bearers of the remote UE that are associated with the connection, based at least in part on a radio access stratum configuration received by the relay UE; and relaying control-plane or user-plane traffic between the remote UE and the base station via the one or more sidelink access stratum entities and the one or more radio access stratum entities.

Aspect 68: The method of aspect 67, wherein the sidelink access stratum configuration relates to one or more logical channels associated with relay traffic, and wherein the sidelink access stratum configuration is received from the remote UE via a sidelink radio resource control configuration.

Aspect 69: The method of any of aspects 67-68, wherein the sidelink access stratum configuration and the radio access stratum configuration relate to one or more logical channels, and wherein the radio access stratum configuration is received from the base station via a radio resource control reconfiguration message that indicates access stratum configuration information for the one or more logical channels.

Aspect 70: The method of aspect 69, wherein the radio access stratum configuration indicates a configuration for at least one of a radio link control entity, a medium access control entity, a physical layer entity, or an adaptation layer entity.

Aspect 71: The method of aspect 70, wherein the adaptation layer entity is separate from and between the radio link control entity and a packet data convergence entity.

Aspect 72: The method of aspect 70, wherein the adaptation layer is part of a packet data convergence entity or the radio link control entity.

Aspect 73: The method of any of aspects 67-72, wherein the one or more sidelink access stratum entities are associated with relay traffic based at least in part on a configuration of the one or more sidelink access stratum entities, and wherein relaying control-plane or user-plane traffic between the remote UE and the base station via the one or more sidelink access stratum entities and the one or more radio access stratum entities further comprises forwarding the control-plane or user-plane traffic to an adaptation layer entity of the relay UE based at least in part on the control-plane or user-plane traffic being associated with the one or more sidelink access stratum entities.

Aspect 74: The method of aspect 73, wherein the one or more sidelink access stratum entities are associated with relay traffic based at least in part on a logical channel identifier associated with the one or more sidelink access stratum entities.

Aspect 75: The method of aspect 74, wherein an adaptation layer entity of the relay UE forwards the control-plane or user-plane traffic from the one or more sidelink access stratum entities to the one or more radio access stratum entities based at least in part on the logical channel identifier.

Aspect 76: The method of any of aspects 67-75, wherein the relay UE is associated with a sidelink signaling entity that handles the sidelink signaling interface, and wherein the unicast link is configured by the sidelink signaling entity.

Aspect 77: The method of any of aspects 67-76, wherein the message comprises a radio resource control message.

Aspect 78: The method of any of aspects 67-77, further comprising: receiving configuration information for a sidelink bearer between the remote UE and the relay UE; establishing the sidelink bearer with the remote UE for the unicast link using one or more sidelink radio resource control messages; and configuring the sidelink bearer in accordance with the configuration information, wherein the sidelink bearer is handled by a sidelink packet data convergence protocol entity or a sidelink service data adaptation protocol entity of the relay UE.

Aspect 79: The method of any of aspects 67-78, wherein the one or more bearers are associated with a user-plane or control-plane radio access entity of the remote UE.

Aspect 80: The method of any of aspects 67-79, wherein the message is encapsulated in a sidelink signaling container.

Aspect 81: The method of any of aspects 67-80, wherein the control-plane or user-plane traffic bypasses a sidelink protocol data convergence protocol entity or a service data adaptation protocol entity of the relay UE.

Aspect 82: An apparatus for wireless communication at a device, comprising a processor; memory coupled with the processor; and instructions stored in the memory and executable by the processor to cause the apparatus to perform the method of one or more aspects of aspects 1-81.

Aspect 83: A device for wireless communication, comprising a memory and one or more processors coupled to the memory, the memory and the one or more processors configured to perform the method of one or more aspects of aspects 1-81.

Aspect 84: An apparatus for wireless communication, comprising at least one means for performing the method of one or more aspects of aspects 1-81.

Aspect 85: A non-transitory computer-readable medium storing code for wireless communication, the code comprising instructions executable by a processor to perform the method of one or more aspects of aspects 1-81.

Aspect 86: A non-transitory computer-readable medium storing a set of instructions for wireless communication, the set of instructions comprising one or more instructions that, when executed by one or more processors of a device, cause the device to perform the method of one or more aspects of aspects 1-81.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a remote user equipment (UE), comprising:
    communicating, without encapsulation in a sidelink signaling container, a radio access connection establishment message with a network entity via a relay UE, wherein the radio access connection establishment message is communicated over a first signaling radio bearer that is configured with a sidelink logical channel for communication via an established sidelink unicast link with the relay UE;
    receiving a radio bearer configuration for one or more bearers from the network entity via a radio access connection that is established based at least in part on the radio access connection establishment message;

receiving an access stratum configuration via the radio access connection, wherein the access stratum configuration is associated with configuring one or more sidelink access stratum entities for the one or more bearers; and receiving or transmitting control-plane or user-plane traffic via the one or more bearers based at least in part on the access stratum configuration.

2. The method of claim 1, wherein the first signaling radio bearer is a signaling radio access bearer 0 (SRB0) associated with radio resource control messaging and is handled by a radio access entity of the remote UE.

3. The method of claim 2, wherein the radio access entity comprises a control-plane radio access packet data convergence protocol entity.

4. The method of claim 2, wherein the remote UE is associated with a sidelink signaling entity that handles a sidelink signaling interface of the remote UE, and wherein the established sidelink unicast link is set up by the sidelink signaling entity.

5. The method of claim 1, wherein the first signaling radio bearer is different than a signaling radio bearer used to set up the established sidelink unicast link.

6. The method of claim 1, wherein a configuration for the first signaling radio bearer and the sidelink logical channel is pre-configured or defined.

7. The method of claim 1, wherein the radio access connection establishment message comprises a radio resource control message associated with transitioning from a radio resource control idle state operation or a radio resource control inactive state operation to a radio resource control connected state operation.

8. The method of claim 1, wherein the control-plane or user-plane traffic bypasses a sidelink protocol data convergence protocol entity or a service data adaptation protocol entity of the remote UE.

9. The method of claim 1, wherein the access stratum configuration is associated with a radio bearer configuration information element for the one or more bearers, and wherein the one or more bearers comprise at least one of a signaling radio bearer or a data radio bearer.

10. The method of claim 9, wherein the radio bearer configuration information element indicates at least one of:
a configuration for a user-plane radio access entity of the remote UE,
a configuration for a control-plane radio access entity of the remote UE, or
a security configuration for the one or more bearers.

11. The method of claim 9, wherein the access stratum configuration includes an information element indicating at least one of a sidelink radio link control entity, a medium access control entity, or a physical layer entity configuration for the one or more bearers.

12. The method of claim 9, wherein the access stratum configuration corresponds to a radio access stratum configuration of the relay UE and includes an information element indicating at least one of radio access discontinuous reception configuration or an inactivity timer for the remote UE for maintaining the radio access connection with the network entity.

13. The method of claim 9, wherein the one or more bearers are handled by a radio access packet data convergence protocol entity or a radio access service data adaptation protocol entity, based at least in part on the radio bearer configuration information element.

14. The method of claim 13, wherein a sidelink radio link control entity of the remote UE is configured to handle a protocol data unit format associated with the radio access packet data convergence protocol entity.

15. The method of claim 1, further comprising:
receiving configuration information for a sidelink bearer between the remote UE and the relay UE, wherein the configuration information includes a particular radio bearer configuration and a particular access stratum configuration for the sidelink bearer;
identifying the sidelink bearer with the relay UE for the established sidelink unicast link based at least in part on one or more sidelink radio resource control messages; and
configuring the sidelink bearer in accordance with the configuration information.

16. A method of wireless communication performed by a network entity, comprising:
establishing a radio access connection with a remote user equipment (UE) via a relay UE, wherein a radio access connection establishment message associated with establishing the radio access connection is communicated without encapsulation in a sidelink signaling container, wherein the radio access connection establishment message is communicated via an established sidelink unicast link between the remote UE and the relay UE;
transmitting a radio bearer configuration and an access stratum configuration for one or more bearers via the radio access connection, wherein the access stratum configuration is associated with configuring one or more sidelink access stratum entities of the remote UE and the relay UE, and wherein the access stratum configuration indicates at least a parameter associated with a radio resource control (RRC) state operation; and
receiving or transmitting control-plane or user-plane traffic associated with the remote UE via the one or more bearers based at least in part on the access stratum configuration.

17. The method of claim 16, wherein the radio access connection establishment message comprises a radio resource control message.

18. The method of claim 16, wherein the access stratum configuration is associated with a radio bearer configuration information element for the one or more bearers, and wherein the one or more bearers comprise at least one of a signaling radio bearer or a data radio bearer.

19. The method of claim 18, wherein the radio bearer configuration information element indicates at least one of:
a configuration for a control-plane radio access entity of the remote UE,
a configuration for a user-plane radio access entity of the remote UE, or
a security configuration for the one or more bearers.

20. The method of claim 16, wherein the radio access connection establishment message is transmitted or received via a signaling radio bearer that is configured with one or more sidelink logical channels for communication associated with establishing the radio access connection, wherein the signaling radio bearer is different than another signaling radio bearer used to configure the established sidelink unicast link, and wherein the signaling radio bearer is handled by a control-plane radio access packet data convergence protocol entity.

21. A method of wireless communication performed by a relay user equipment (UE), comprising:

relaying, via a first signaling radio bearer that is configured with a sidelink logical channel for communication, via an established sidelink unicast link with a remote UE, a radio access connection establishment message, wherein the radio access connection establishment message is associated with establishing a radio access connection between the remote UE and a network entity via the established sidelink unicast link, wherein the radio access connection establishment message is communicated without encapsulation in a sidelink signaling container;

receiving a sidelink access stratum configuration for one or more bearers of the remote UE that are associated with the radio access connection, wherein the sidelink access stratum configuration is associated with one or more sidelink access stratum entities;

receiving a radio access stratum configuration for the one or more bearers of the remote UE that are associated with the radio access connection, wherein the radio access stratum configuration is associated with one or more radio access stratum entities associated with the network entity; and relaying control-plane or user-plane traffic between the remote UE and the network entity via the one or more bearers.

22. The method of claim 21, wherein the sidelink access stratum configuration relates to one or more logical channels associated with relay traffic, and wherein the sidelink access stratum configuration is received from the remote UE via a sidelink radio resource control configuration.

23. The method of claim 21, wherein the sidelink access stratum configuration and the radio access stratum configuration relate to one or more logical channels, and wherein the radio access stratum configuration is received from the network entity via a radio resource control reconfiguration message that indicates access stratum configuration information for the one or more logical channels.

24. The method of claim 23, wherein the radio access stratum configuration indicates a configuration for an adaptation layer entity.

25. The method of claim 24, wherein the adaptation layer entity is separate from and between a radio link control entity and a packet data convergence entity.

26. The method of claim 24, wherein the adaptation layer is part of a packet data convergence entity or a radio link control entity.

27. The method of claim 21, wherein the one or more sidelink access stratum entities are associated with relay traffic based at least in part on a configuration of the one or more sidelink access stratum entities, and wherein relaying control-plane or user-plane traffic between the remote UE and the network entity via the one or more bearers further comprises forwarding the control-plane or user-plane traffic to an adaptation layer entity of the relay UE based at least in part on the control-plane or user-plane traffic being associated with the one or more sidelink access stratum entities.

28. The method of claim 21, wherein the one or more sidelink access stratum entities are associated with relay traffic based at least in part on a logical channel identifier associated with the one or more sidelink access stratum entities, and wherein an adaptation layer entity of the relay UE forwards the control-plane or user-plane traffic from the one or more sidelink access stratum entities to the one or more radio access stratum entities based at least in part on the logical channel identifier.

29. The method of claim 21, further comprising:
receiving configuration information for a sidelink bearer between the remote UE and the relay UE, wherein the configuration information includes a particular radio bearer configuration and a particular access stratum configuration for the sidelink bearer;
identifying the sidelink bearer with the remote UE for the established sidelink unicast link based at least in part on one or more sidelink radio resource control messages; and
configuring the sidelink bearer in accordance with the configuration information.

30. The method of claim 21, wherein the radio access stratum configuration indicates a configuration for at least one of a radio link control entity, a medium access control entity, or a physical layer entity.

31. A remote user equipment (UE) for wireless communication, comprising:
a memory; and
one or more processors coupled to the memory, the one or more processors configured to:
communicate, without encapsulation in a sidelink signaling container, a radio access connection establishment message with a network entity via a relay UE, wherein the radio access connection establishment message is communicated over a first signaling radio bearer that is configured with a sidelink logical channel for communication via an established sidelink unicast link with the relay UE;
receive a radio bearer configuration for one or more bearers from the network entity via a radio access connection that is established based at least in part on the radio access connection establishment message;
receive an access stratum configuration via the radio access connection, wherein the access stratum configuration is associated with configuring one or more sidelink access stratum entities for the one or more bearers; and
receive or transmit control-plane or user-plane traffic via the one or more bearers based at least in part on the access stratum configuration.

32. The remote UE of claim 31, wherein the first signaling radio bearer is a signaling radio access bearer 0 (SRB0) associated with radio resource control messaging and is handled by a radio access entity of the remote UE.

33. The remote UE of claim 31, wherein the remote UE is associated with a sidelink signaling entity that handles a sidelink signaling interface of the remote UE.

34. The remote UE of claim 31, wherein the access stratum configuration includes an information element indicating at least one of a sidelink radio link control entity, a medium access control entity, or a physical layer entity configuration for the one or more bearers.

35. The remote UE of claim 31, wherein the access stratum configuration is associated with a radio bearer configuration information element for the one or more bearers, and wherein the one or more bearers comprise at least one of a signaling radio bearer or a data radio bearer.

36. A network entity for wireless communication, comprising:
a memory; and
one or more processors coupled to the memory, the one or more processors configured to:
establish a radio access connection with a remote user equipment (UE) via a relay UE, wherein a radio access connection establishment message associated with establishing the radio access connection is communicated without encapsulation in a sidelink signaling container, wherein the radio access connection establishment message is communicated via an established sidelink unicast link between the remote UE and the relay UE;

transmit a radio bearer configuration and an access stratum configuration for one or more bearers via the radio access connection, wherein the access stratum configuration is associated with configuring one or more sidelink access stratum entities of the remote UE and the relay UE, and wherein the access stratum configuration indicates at least a parameter associated with a radio resource control (RRC) state operation; and receive or transmit control-plane or user-plane traffic associated with the remote UE via the one or more bearers based at least in part on the access stratum configuration.

37. The network entity of claim 36, wherein the radio access connection establishment message comprises a radio resource control message.

38. The network entity of claim 37, wherein the radio access connection establishment message is transmitted or received via a signaling radio bearer that is configured with one or more sidelink logical channels for communication associated with establishing the radio access connection.

39. The network entity of claim 38, wherein the signaling radio bearer is different than another signaling radio bearer used to configure the established sidelink unicast link.

40. The network entity of claim 38, wherein the signaling radio bearer is handled by a control-plane radio access packet data convergence protocol entity.

41. A relay user equipment (UE) for wireless communication, comprising:

a memory; and one or more processors coupled to the memory, the one or more processors configured to:

relay, via a first signaling radio bearer that is configured with a sidelink logical channel for communication, via an established sidelink unicast link with a remote UE, a radio access connection establishment message, wherein the radio access connection establishment message is associated with establishing a radio access connection between the remote UE and a network entity via the established sidelink unicast link, wherein the radio access connection establishment message is communicated without encapsulation in a sidelink signaling container;

receive a sidelink access stratum configuration for one or more bearers of the remote UE that are associated with the radio access connection, wherein the sidelink access stratum configuration is associated with one or more sidelink access stratum entities;

receive a radio access stratum configuration for the one or more bearers of the remote UE that are associated with the radio access connection, wherein the radio access stratum configuration is associated with one or more radio access stratum entities associated with the network entity; and relay control-plane or user-plane traffic between the remote UE and the network entity via the one or more bearers.

42. The relay UE of claim 41, wherein the radio access stratum configuration indicates a configuration for at least one of a radio link control entity, a medium access control entity, or a physical layer entity.

43. The relay UE of claim 41, wherein the radio access stratum configuration indicates a configuration for an adaptation layer entity.

44. The relay UE of claim 43, wherein the adaptation layer is part of a packet data convergence entity or a radio link control entity.

45. The relay UE of claim 41, wherein the one or more sidelink access stratum entities are associated with relay traffic based at least in part on a configuration of the one or more sidelink access stratum entities.

* * * * *